US 6,646,493 B2
Nov. 11, 2003

(12) United States Patent
Butler

(54) VOLTAGE CHARGE PUMP WITH CIRCUIT TO PREVENT PASS DEVICE LATCH-UP

(75) Inventor: Hal Butler, Boise, ID (US)

(73) Assignee: Micron Technology, Inc., Boise, ID (US)

(*) Notice: Subject to any disclaimer, the term of this patent is extended or adjusted under 35 U.S.C. 154(b) by 56 days.

(21) Appl. No.: 09/929,776

(22) Filed: Aug. 14, 2001

(65) Prior Publication Data

US 2003/0034826 A1 Feb. 20, 2003

(51) Int. Cl.[7] .................................................. G05F 1/10
(52) U.S. Cl. ...................................................... 327/536
(58) Field of Search ................................. 327/530, 534, 327/535, 536, 537

(56) References Cited

U.S. PATENT DOCUMENTS

| 5,126,590 | A |   | 6/1992  | Chern .................... 307/296.2 |
| 5,172,013 | A | * | 12/1992 | Matsumura ................ 327/536 |
| 5,537,306 | A |   | 7/1996  | Blodgett ...................... 363/60 |
| 5,642,073 | A |   | 6/1997  | Manning .................... 327/536 |
| 5,677,645 | A |   | 10/1997 | Merritt ....................... 327/536 |
| 5,692,164 | A |   | 11/1997 | Pantelakis ................... 395/556 |
| 5,828,095 | A |   | 10/1998 | Merritt ....................... 257/299 |
| 5,831,470 | A |   | 11/1998 | Park et al. .................. 327/536 |
| 5,939,935 | A |   | 8/1999  | Merritt ....................... 327/536 |
| 5,943,226 | A |   | 8/1999  | Kim ............................ 363/60 |
| 6,023,187 | A |   | 2/2000  | Camacho et al. ........... 327/536 |
| 6,055,193 | A |   | 4/2000  | Manning et al. ....... 365/189.11 |
| 6,075,402 | A |   | 6/2000  | Ghilardelli et al. ......... 327/536 |
| 6,121,822 | A | * | 9/2000  | Merritt ....................... 327/536 |
| 6,208,197 | B1 | * | 3/2001  | Ternullo et al. ............ 327/390 |
| 6,225,854 | B1 |   | 5/2001  | Cha ............................ 327/536 |
| 6,229,381 | B1 |   | 5/2001  | Keeth ......................... 327/536 |
| 6,285,241 | B1 |   | 9/2001  | Yoshida ...................... 327/536 |
| 2001/0035787 | A1 | * | 11/2001 | Merritt et al. .............. 327/536 |

* cited by examiner

Primary Examiner—Jeffrey Zweizig
(74) Attorney, Agent, or Firm—Schwegman, Lundberg, Woessner & Kluth, P.A.

(57) ABSTRACT

A charge pump is disclosed with a circuit to prevent pass device latch-up. The charge pump includes at least one charge storage device and a pre-charge circuit to charge the at least one charge storage device to a charge level to provide a predetermined output voltage from the charge pump. A pass device is coupled between the charge storage device and an output of the charge pump, and a circuit is coupled to the pass device to prevent a latch-up condition.

69 Claims, 12 Drawing Sheets

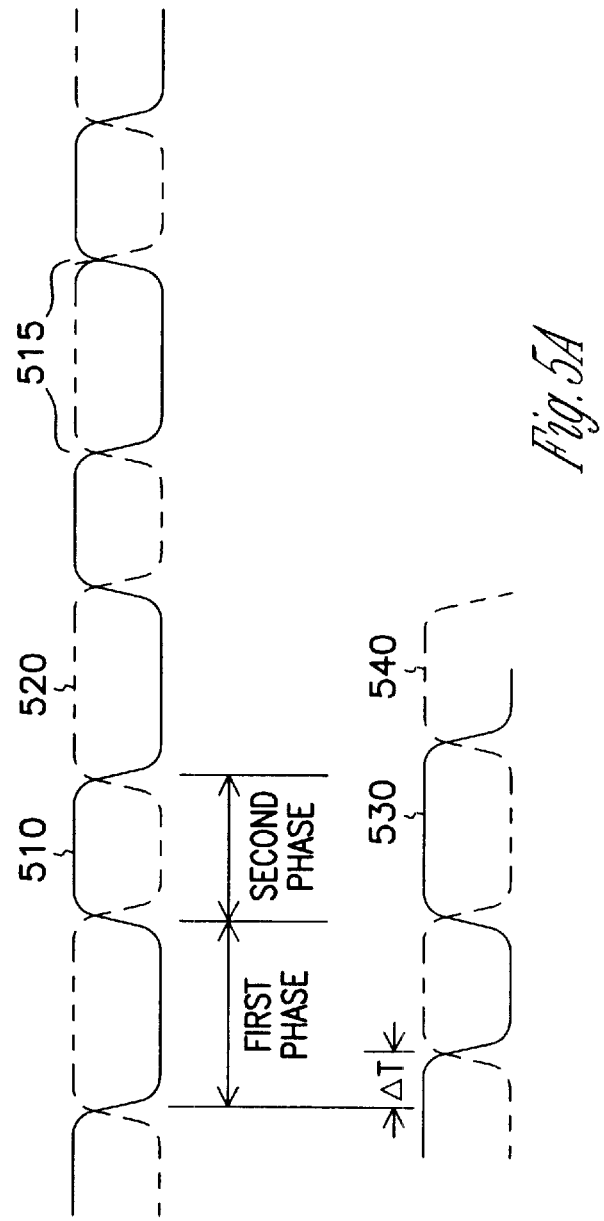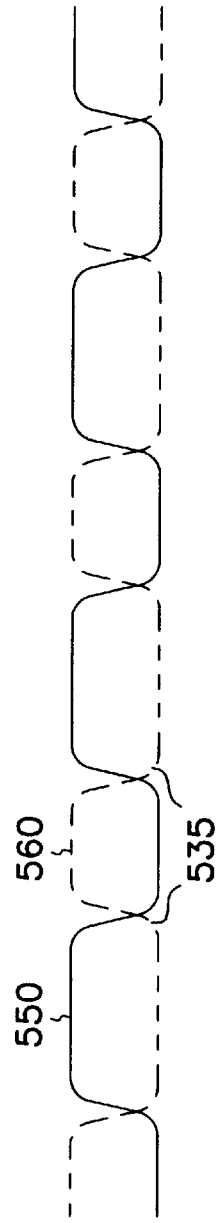

VOLTAGE CHARGE PUMP WITH CIRCUIT TO PREVENT PASS DEVICE LATCH-UP

REFERENCE TO RELATED APPLICATIONS

The present invention is related to patent application Ser. No. 09/560,121, filed Apr. 28, 2000 and U.S. application Ser. No. 09/797,320, filed Mar. 1, 2001.

FIELD OF THE INVENTION

The present invention relates generally to semiconductor integrated circuits, and more particularly to charge pumps.

BACKGROUND OF THE INVENTION

System designs are routinely constrained by a limited number of readily available power supply voltages ($V_{cc}$). For example, consider a portable computer system powered by a conventional battery having a limited power supply voltage. For proper operation, different components of the system, such as display, processor, and memory components employ diverse technologies which require power to be supplied at various operating voltages. Components often require operating voltages of a greater magnitude than the power supply voltage and, in other cases, a voltage of reverse polarity. The design of a system, therefore, includes power conversion circuitry to efficiently develop the required operating voltages. One such power conversion circuit is known as a charge pump. Charge pumps have been used as on-chip voltage generators capable of providing a voltage more positive than the most positive external supply or more negative than the most negative external supply. The demand for highly efficient and reliable charge pump circuits has increased with the increasing number of applications utilizing battery powered systems, such as notebook computers, portable telephones, security devices, battery-backed data storage devices remote controls, instrumentation, and patient monitors, to name a few.

Inefficiencies in conventional charge pumps lead to reduced system capability and lower system performance in both battery and non-battery operated systems. Inefficiency can adversely affect system capabilities e.g., limited battery life, excess heat generation and high operating costs. Examples of lower system performance include low speed operation, excessive operating delays, loss of data, limited communication range, and inability to operate over wide variations in ambient conditions including ambient light level and temperature.

Charge pumps utilize a pass device or gating device to connect the higher amplitude voltage to an output of the charge pump after the charge pump has accumulated or built-up sufficient charge to provide the desired voltage level and polarity. The pass device may be an N-well or P-well field effect transistor (FET) formed in a substrate of material of different conductivity. Accordingly, the N-well or P-well will form a P-N junction with the substrate. If this P-N junction becomes forward biased, a latch-up condition can occur and the pass device or gating device can be damaged or destroyed and the charge pump rendered non-operational.

Accordingly, there is a need for a charge pump that can operate efficiently and is not subject to a latch-up condition.

SUMMARY OF THE INVENTION

In accordance with the present invention, a charge pump for providing a higher output voltage relative to an input or supply voltage includes a charge storage device or main pump capacitor. A pre-charge circuit is included for pre-charging the charge storage device to a charge level to provide a predetermined output voltage from the charge pump. A pass device is coupled between the charge storage device and an output of the charge pump. A circuit is coupled to the pass device to prevent latch-up of the pass device.

In another embodiment of the present invention, an electronic system includes at least one component operating at a predetermined voltage higher or more negative than a supply voltage. A charge pump is coupled to the at least one component to generate the predetermined voltage and includes a charge storage device or main pump capacitor. A pre-charge circuit is provided to pre-charge the charge storage device to provide the predetermined voltage and a pass device is provided to connect the charge storage device to an output of the charge pump. The charge pump further includes a circuit to prevent a well of the pass device from being forward biased.

In accordance with another embodiment of the present invention, a method for making a charge pump includes forming a charge storage device; forming a pre-charge circuit for charging the charge storage device to a charge level to provide a predetermined output voltage from the charge pump; forming a pass device to connect the charge storage device to an output of the charge pump; and forming a circuit to prevent a latch-up condition of the pass device.

In accordance with a further embodiment of the present invention, a method for generating a predetermined voltage higher than a supply voltage includes generating a plurality of signals; boosting a charge level of a charge storage device in response to the plurality of signals; outputting the predetermined voltage when the charge level of the charge storage device reaches a predetermined level; and preventing a latch-up condition.

These and other embodiments, aspects, advantages and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

In the drawings, like numerals describe substantially similar components throughout the several views. Like numerals having different letter suffixes or primed (X') represent different instances of substantially similar components.

FIGS. 5A and 5B are examples of phase or driver signals generated by the charge pump in accordance with one embodiment of the present invention.

DESCRIPTION OF THE EMBODIMENTS

Figure 1:
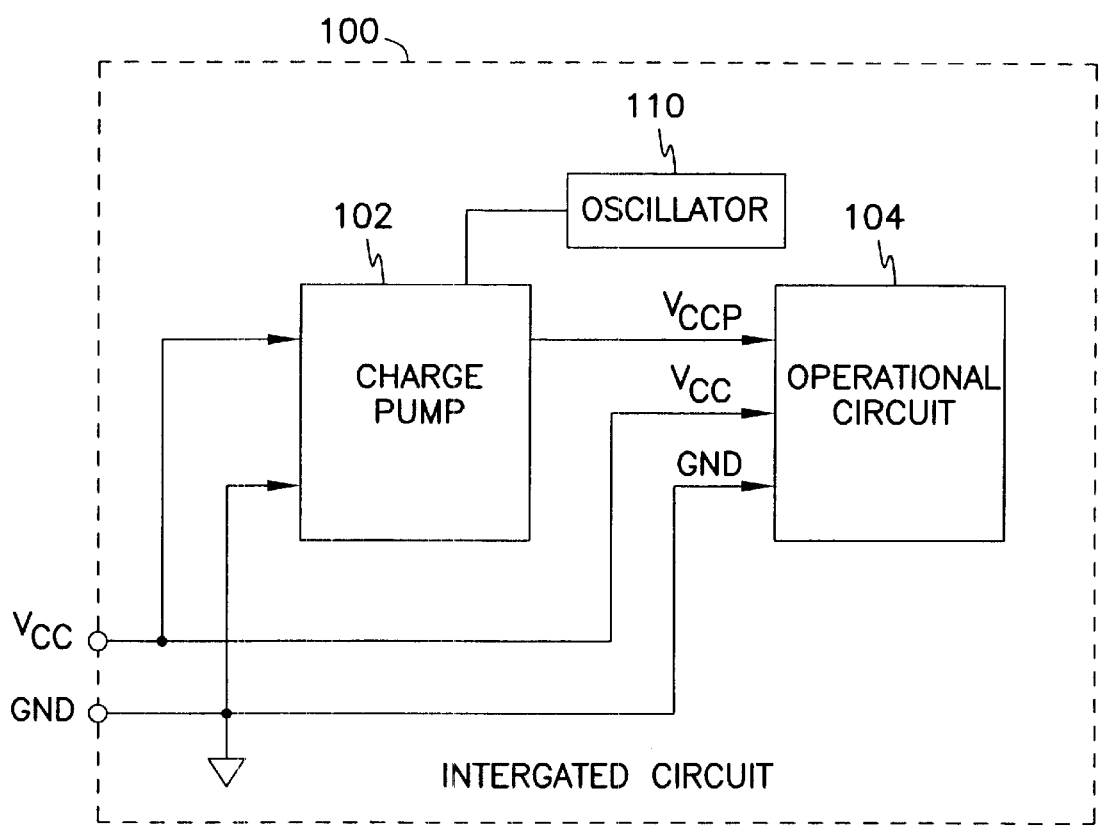
FIG. 1 is a block schematic diagram of a portion of an integrated circuit utilizing a charge pump in accordance the present invention.

In the following detailed description of the preferred embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that process or mechanical changes may be made without departing from the scope of the present invention. The terms wafer and substrate used in the following description include any base semiconductor structure. Both are to be understood as including silicon-on-sapphire (SOS) technology, silicon-on-insulator (SOI) technology, thin film transistor (TFT) technology, doped and undoped semiconductors, epitaxial layers of a silicon supported by a base semiconductor, as well as other semiconductor support structures well known to one skilled in the art. Furthermore, when reference is made to a wafer or substrate in the following description, previous process steps may have been utilized to form regions/junctions in the base semiconductor structure. The following detailed description is, therefore, not to be taken in a limiting sense, and the scope of the present invention is defined only by the appended claims.

The transistors described herein include transistors from bipolar-junction technology (BJT), field effect technology (FET), or complimentary metal-oxide semiconductor (CMOS). A metal-oxide-semiconductor (MOS) transistor includes a gate, a first node (drain) and a second node (source). Since a MOS transistor is typically a symmetrical device, the true designation of "source" and "drain" is only possible once voltage is impressed on the terminals. The designations of source and drain herein should be interpreted, therefore, in the broadest sense.

The charge pump circuit here described is a two phase circuit, therefore only one half of the charge pump is producing $V_{ccp}$ at any given time. The "first phase" is herein defined as the time when an input IN1 to the charge pump is high and the "second phase" is defined as the time when the input IN2 to the charge pump is high.

The terms "crossing around their high points" and "high—high crossing points" refers to the crossing of the first and second signals around their high points of the signals generated by the first and second primary phase generators. Also the phases for the first and second main pump capacitors generally cross high—high for optimum efficiency of the charge pump.

The term "phase generator" means a circuit to generate phase, driver or control signals during a phase cycle.

The terms "control circuit" or "control device" means any component, circuit or device or group of components, circuits or devices that provide a signal or signals or otherwise influence the operation or timing of operation of another component, circuit or device or group of components, circuits or devices.

The terms "crossing around their low points" and "low—low crossing points" refers to the crossing of the first and second signals around low points of the signals generated by the first and second primary phase generators. Also the phases for the pre-charge capacitors generally cross low—low for optimum efficiency of the charge pump.

The term "pre-charging capacitors/device" described herein includes any devices capable of providing charges to maintain a predetermined level of charges in an energy-storing device while a system that includes the energy-storing device is turned off. The reason for pre-charging is thus: the energy-storing device may have to store a large amount of charge to enable a charge pump circuit to provide a high-voltage signal. Without pre-charging, an undesired amount of time may have to be taken once the system is turned on to charge the energy-storing device. The pre-charging device described herein can be a square-law device. The pre-charging device described herein can be any transistor fabricated on an integrated circuit using any fabrication technique. The pre-charging device described herein however, may be fabricated as an n-channel transistor with its drain and gate connected together; the drain is connected to an external supply.

The terms "pre-boot capacitors" and "pre-boosting stages" described herein includes any devices capable of providing charges to maintain a predetermined level of charge in an energy storing device while a system that includes the energy storing device is turned off. Pre-boot capacitors are used first to boot the first and second main pump capacitors to a predetermined boot level. While the first main capacitor is outputting a charge in the first phase, the pre-boot is booting the second main capacitor to a predetermined boot level in the second phase and vice-versa. This process hides the pre-boot time and enables the charge pump circuit to run at a faster cycle time resulting in outputting more charge for a given size of a capacitor.

The term "booting" described herein refers to the principle that the charge on a capacitor cannot change instantaneously. That is, if the voltage on a first side of capacitor is instantaneously increased, the second side of the capacitor will increase by the same amount. The voltage on the second side of the capacitor is therefore "booted" higher.

The term "main energy storing device or charge storage device" means any device capable of storing charge or the main pump capacitor that outputs a desired level of a high-voltage signal during the first or second phase of a phase cycle.

The embodiments of the present invention generate higher voltage at a high efficiency by a charge pump using a low voltage supply.

FIG. 1 is a block diagram of an integrated circuit 100 illustrating generally one embodiment of the present invention. The integrated circuit 100 includes a charge pump 102, an oscillator 110, and an operational circuit 104. The operational circuit 104 can be any functional circuit; for example, a memory device such as a dynamic random access memory (DRAM) or flash memory. The charge pump 102 converts $V_{cc}$ provided by an external power supply into a higher potential or voltage $V_{ccp}$ or more negative potential, if $V_{ccp}$ is to be of the opposite polarity. The operational circuit 104, therefore, has both $V_{cc}$ and $V_{ccp}$ available.

Figure 2A:
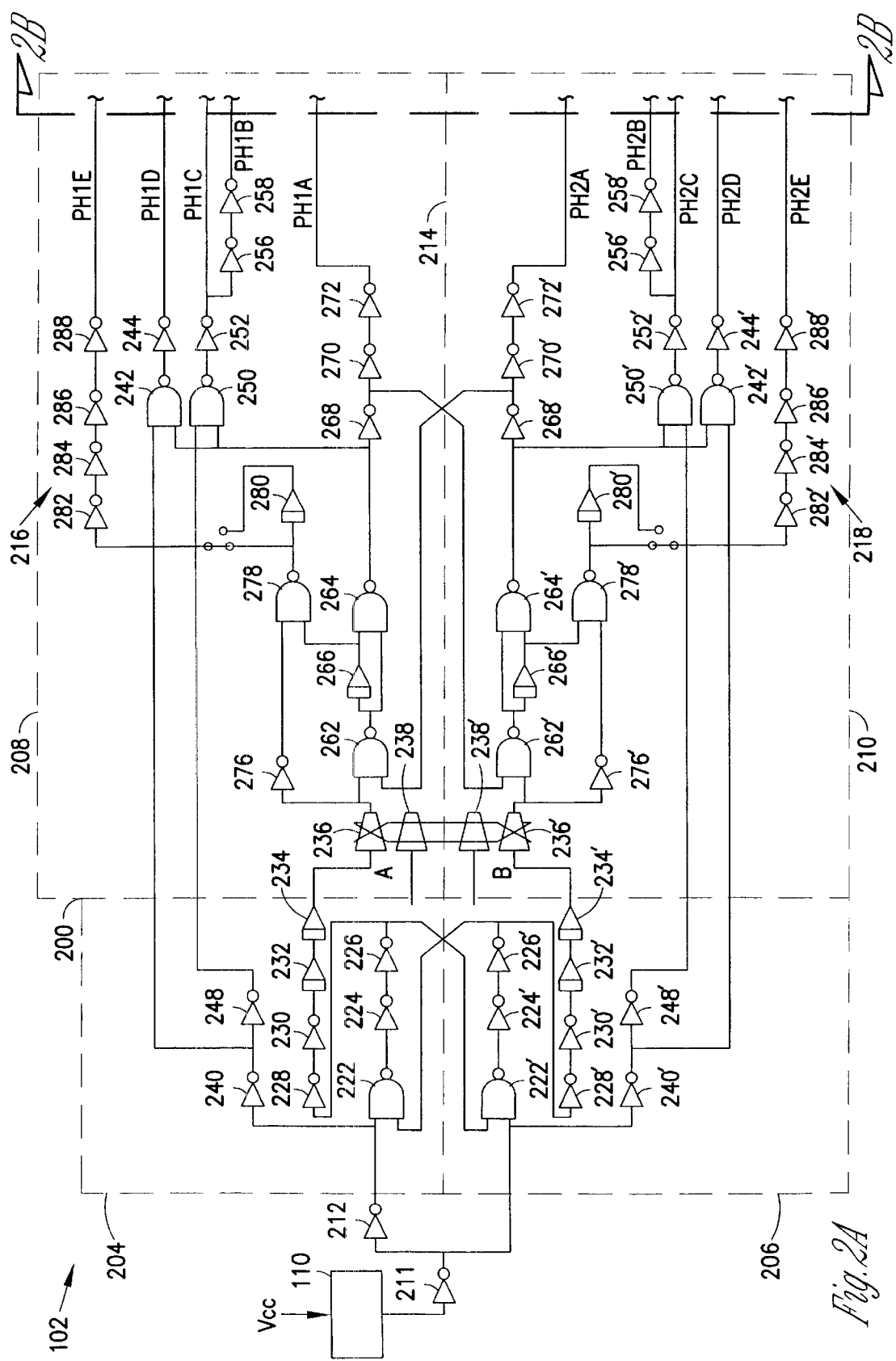
FIGS. 2A and 2B are a schematic diagram of a charge pump in accordance with the present invention.
Figure 2B:
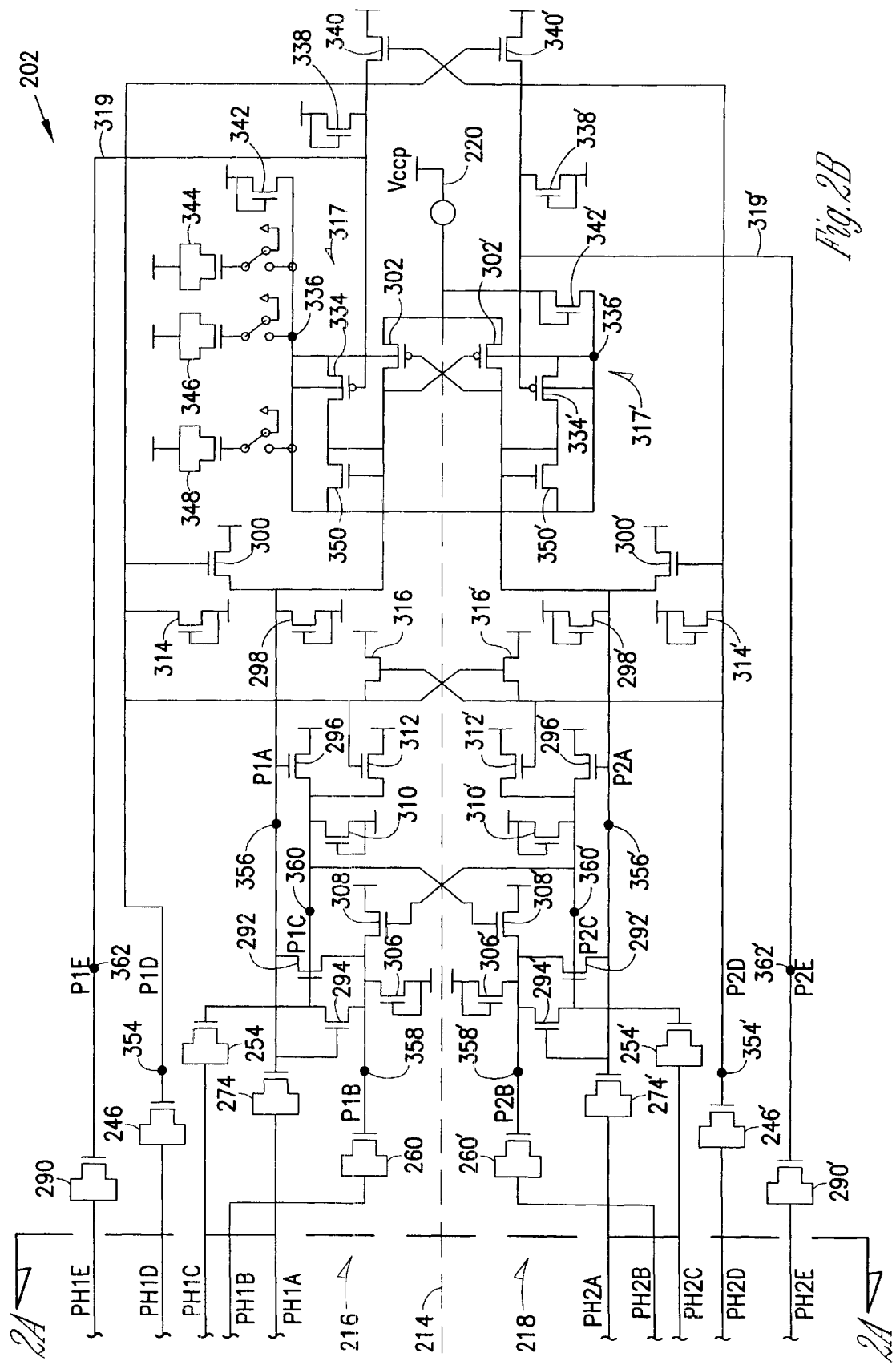

FIGS. 2A and 2B are a schematic diagram of an example of a two phase charge pump circuit 102 illustrating generally the present invention. FIG. 2A is a substantially first portion or logic circuit portion 200 of the charge pump 102 and FIG. 2B is substantially a second portion or charge storage, pre-charge, pre-boot circuit portion 202 of the charge pump 102 which may be referred to hereinafter as simply charge circuit portion 202. The first or logic circuit portion 200 provides timing, control and driver signals that control the operation of and drive the charge storage devices, pre-boot and pre-charge devices and associated circuitry in the second or charge circuit portion 202 of the charge pump 102 in FIG. 2B. The logic portion 200 of the charge pump circuit 102 may include a plurality of phase generators, a first primary phase generator 204, a second primary phase generator 206, a first secondary phase generator 208 and a second secondary phase generator 210. The division of the logic portion 200 into different phase generators is to facilitate explanation of the present invention and is not intended to provide any limitations to the present invention.

The supply voltage Vcc is coupled to the oscillator 110 and the output of the oscillator 110 may be coupled to an inverter 211. The output of the inverter 211 is coupled to the first primary phase generator 204 and the second primary phase generator 206. The output signal from the inverter 211 is inverted by an inverter 212 to provide the input signal "IN1" for the first primary phase generator 204 and the output signal from the inverter 211 also provides the input signal "IN2" for the second primary phase generator 206. Accordingly, the input signals IN1 and IN2 are complementary signals or 180° out of phase relative to one another. The charge pump 102 has a substantially symmetrical architecture about a centerline 214 with substantially identical components in both halves or sides 216 and 218. As will be described in more detail below, in operation, one half 216 of the charge pump 102 is providing a predetermined higher amplitude voltage (or more negative voltage) Vccp than a supply voltage Vcc at an output 220 of the charge pump 102, while the other half 218 of the charge pump 102 is being pre-charged to supply the predetermined higher voltage Vccp.

A NAND gate 222 of the first primary phase generator 204 has one input coupled to the inverter 212 to receive the input IN1. The NAND gate 222 is then coupled to two series connected inverters 224 and 226. Similarly, the second primary phase generator 206 includes a NAND gate 222' with an input connected to receive the input IN2. The NAND gate 222' is coupled to two series connected inverters 224' and 226'. The output of the second inverter 226 of the first primary phase generator 204 is cross connected to another input of the NAND gate 222' of the second primary generator 206, and the output of the second inverter 226' is cross-connected to another input of the NAND gate 222. The output of the second inverter 226 is also coupled to a pair inverters 228 and 230 and a pair of delays 232 and 234 all connected in series with inverter 226. The second delay 234 is connected to a multiplexer or MUX 236 that defines an input to the first secondary generator 208. As shown in FIG. 2A, the second primary phase generator 206 has an identical structure to the first primary phase generator 204 with the inverter 226' being connected in series with inverters 228' and 230' and delays 232' and 234', all connected in series to MUX 236'. Additional MUXs 238 and 238' may be provided to connect first and second phase signals to the first and second secondary phase generators 208 and 210, respectively.

The IN1 and IN2 input signals are also respectively connected to inverters 240 and 240'. An output of the inverter 240 is coupled to a NAND gate 242 which is coupled to an inverter 244. The output of the inverter 244 provides a first pre-charge drive signal to a first pre-charge capacitor 246 shown in FIG. 2B during a first phase of operation of the charge pump 102. Similarly, the output of an inverter 240' is coupled to a NAND gate 242' which is coupled to an inverter 244'. The output of the inverter 244' provides a second pre-charge drive signal to a second pre-charge capacitor 246' shown in FIG. 2B during a second phase of operation of the charge pump 102.

The output of inverters 240 and 240' are also respectively coupled to inverters 248 and 248' and the inverters 248 and 248' are respectively coupled to an input of NAND gates 250 and 250'. The outputs of NAND gates 250 and 250' are respectively connected to inverters 252 and 252' which are in turn coupled to first and second pre-boot gating capacitors 254 and 254' respectively. The output of the inverter 252 provides a first pre-boot gate drive signal to the first pre-boot gating capacitor 252 during a first phase of operation of the charge pump 102, and the output of the inverter 252' provides a second pre-boot gate drive signal to the second pre-boot gating capacitor 254' during a second phase of operation of the charge pump 102. The output of inverter 252 is also connected to series connected inverters 256 and 258. Likewise, the output of inverter 252' is connected to series connected inverters 256' and 258'. The output of the second inverter 258 is coupled to the first pre-boot capacitor 260 (FIG. 2B) to provide a first pre-boot drive signal to the first pre-boot capacitor 260 during the first phase of operation and the output of the second inverter 258' of the second secondary phase generator 210 is connected to the second pre-boot capacitor 260' (FIG. 2B) to provide a second pre-boot drive signal to the second pre-boot capacitor 260' during the second or opposite phase of operation.

The output of MUXs 236, 238 (FIG. 2A) are coupled to NAND gate 262 to drive and control a portion of the first phase of the charge pump operation and the output of MUXs 236' and 238' are coupled to NAND gate 262' to drive and control a portion of the opposite or second phase of the charge pump operation. The output of the NAND gate 262 is connected to one input of another NAND gate 264 and to another input of the NAND gate 264 through a delay device 266. Similarly for the opposite or second phase, NAND gate 262' is connected to one input of NAND gate 264' and to another input of NAND gate 264' via a delay device 266'. The output of NAND gate 264 is coupled to inputs of NAND gates 242 and 250 to provide the signals to control and drive the first pre-charge capacitor 246 and to control and drive the first pre-boot gating capacitor 254, as previously discussed. Likewise, NAND gate 264' is coupled to inputs of NAND gates 242' and 250' to provide signals to control and drive second pre-charge capacitor 246' and second pre-boot capacitor 254'. The output of NAND gates 264 and 264' are also respectively coupled to inverters 268 and 268'. The outputs of inverters 268 and 268' are respectively cross-coupled to inputs of NAND gates 262' and 262. The outputs of inverters 268 and 268' are also respectively connected to a pair of series connected inverters 270 and 272 and 270' and 272'. The output of the second inverter 272 is connected to provide drive signals to a first main pump capacitor 274 (FIG. 2B) for the first phase of operation, and the output of the second inverter 272' is connected to a second main pump capacitor 274' (FIG. 2B) to provide drive and control signals for the second or opposite phase of operation.

The output of the MUXs 236 and 238 are also connected to inverter 276 and similarly, MUXs 236' and 238' are also connected to inverter 276'. The outputs of inverters 276 and 276' are respectively coupled to one input of NAND gates 278 and 278'. Another input of each of NAND gates 278 and 278' are connected to the delay devices 266 and 266', respectively. The outputs of NAND gates 278 and 278' are connected respectively to delay device 280 and 280' and to inverters 282 and 282'. The inverters 282 and 282' are each connected to three series connected inverters 284, 286 and 288 and 284', 286' and 288', respectively. The output of the last inverters 288 and 288' are respectively coupled to provide drive and control signals to clamp device control or gate capacitors 290 and 290' (FIG. 2B).

A back side or working side of first main pump capacitor 274 is coupleable to a back side or working side of the first pre-boot capacitor 260 by an electronic switch or N-channel switching device or transistor 292. The back side or working side of the first main pump capacitor 274 is also coupled to a gate of N-channel switching device 294 and a gate of N-channel switching device 296. The back side of the first main pump capacitor 274 is also connectable to the supply voltage $V_{cc}$ by N-channel devices 298 and 300 that form a portion of the pre-charging circuit for the first main pump capacitor 274. It should be noted that the line shown connected to the other terminals of devices 298 and 300 is representative of the supply voltage $V_{cc}$ and that this convention is used throughout the drawings. Similar to the first main pump capacitor 274, the second main pump capacitor 274' is coupleable to a back side of the second pre-boot capacitor 260' by an N-channel switching device 292', and the back side of the second main pump capacitor 274' is also coupled to the switching devices 294', 296'. The second main pump capacitor is also coupleable to the supply voltage $V_{cc}$ by switching devices 298' and 300'. The back side of the first main pump capacitor 274 and the back side of the second main pump capacitor 274' are further each connected to a first and second P-channel pass device or transistor 302 and 302', respectfully. The first and second P-channel pass devices 302 and 302' will alternately couple the first and second main pump capacitors 274 and 274' to the output 220 of the charge pump 102 to provide the predetermined voltage higher than the supply voltage (or more negative than the supply voltage Vcc).

The first and second pre-boot capacitors 260 and 260' are coupled to N-channel switching devices 306, 308 and 306' and 308', respectively. The switching devices 306 and 308 connect the first pre-boot capacitor 260 to the supply voltage Vcc to charge the first pre-boot capacitor 260 when the switching devices 306 and 308 are active or turned on and the switching devices 306' and 308' connect the second pre-boot capacitor 260' to the supply voltage for charging the second pre-boot capacitor 260' when the switching devices 306' and 308' are turned on or operational. The gate of switching device 308 is connected to the working side of the second pre-boot gating capacitor 254' to control the timing of the charging of the first pre-boot capacitor 260. Likewise, the gate of switching device 308' is connected to the working side of the first pre-boot gating capacitor 254 to control the timing of the charging of the second pre-boot capacitor 260'. Accordingly the first and second pre-boot gating capacitors 254 and 254' control the charging of the second and first pre-boot capacitors 260' and 260, respectively, by controlling the operation of the N-channel switching devices 308' and 308.

The back side or working side of the first pre-boot gating capacitor 254 is connectable to the supply voltage Vcc by N-channel switching devices 310, 296 and 312 that define the charging circuitry for the pre-boot gating capacitor 254. The back side or working side of the second pre-boot gating capacitor 254' is coupled to a similar charging circuit.

The back side of first pre-charge capacitor 246 is coupled to supply voltage Vcc by N-channel switching devices 314 and 316 when turned on. Switching devices 314 and 316 define charging circuitry for the first pre-charge capacitor 246. Similarly, the back side of second pre-charge capacitor 246' is coupled to supply voltage Vcc by N-channel switching devices 314' and 316' when turned on. Therefore, switching devices 314' and 316' constitute a charging circuit for the second pre-charge capacitor 246'. The back side of the first and second pre-charge capacitors 246 and 246' are also cross-connected to the gates of N-channel switching devices 316' and 316, respectively and to the gates of N-channel switching devices 312 and 312', respectively and 300 and 300', respectively.

Figure 3:
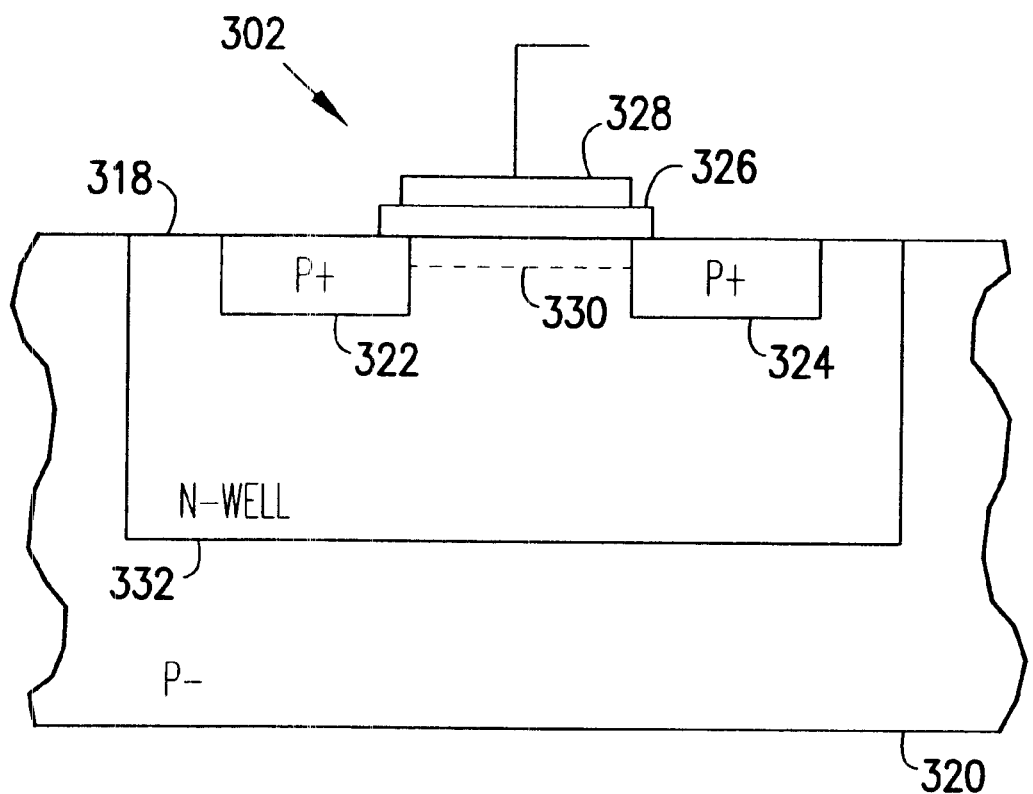
FIG. 3 is a cross-sectional view of a pass device in accordance with the present invention.

In accordance with the present invention, the charge pump 102 includes a first and second clamp circuit 317 and 317' to prevent an N-well of the first and second P-channel pass devices 302 and 302' from becoming forward biased and entering into a latch-up condition that could damage or destroy the complementary metal oxide semiconductor (CMOS) pass devices 302 and 302'. Referring also to FIG. 3 which is a cross-section of a P-channel pass device 302 or 302', a well 318 of N type semiconductor material is formed in a substrate 320 of P type semiconductor material that may be doped more negative (P−). P type regions 322 and 324 are formed in the N-well 318 to form source and drain regions. The P type regions 322 and 324 may be doped with a dopant to make them more positive (P+). A gate oxide layer 326 is formed over the N-well 318 and at least a portion of the source and drain regions 322 and 324. A conductive material forming a gate 328 is formed on the oxide layer 326. A positive voltage above a predetermined threshold applied to the gate 328 will induce a conductive P-channel 330 between the source and drain regions 322 and 324 to turn on the pass device 302. The N-well 318 and the P− substrate 320 form a PN junction 332. If this PN junction 332 becomes forward biased, a condition referred to as latch-up can occur and the current flow across the PN junction can continue to increase to a magnitude that will destroy the pass device 302.

In accordance with the present invention, the clamp circuit or first and second circuits 317 and 317' will connect the N-wells 318 of the first and second pass devices 302 and 302' to a node or to a voltage level within the charge pump 102 and can switch to different nodes or voltage sources within the charge pump 102 to continuously insure that the N-well does not become forward biased.

Referring back to FIG. 2B, as one example of the clamp circuit 317, a first P-channel clamp device or transistor 334 is coupled between the N-well 318 of the first P-channel pass device 302 and the back or working side of the first main pump capacitor 274 to connect and disconnect the N-well 318 to the first main pump capacitor 274 to prevent forward biasing of the N-well 318 and a latch-up condition in the first pass device 302. Similarly, the second clamp circuit 317' includes a P-channel clamp device 334' coupled between the N-well 318 of the second pass device 302' and the second main pump capacitor 274' to prevent latch-up. A gate of the first clamp device 334 is connected to a control circuit or device 319 including the first clamp device control or gate capacitor 290 to control the operation of the first clamp device 334 to turn on the first clamp device 334 to connect the N-well 318 to the first main pump capacitor 274 or to turn off the first clamp device 334 to disconnect the N-well 318 from the first main pump capacitor 274 during which time the N-well 318 is connected only to a node 336 at a voltage potential to prevent the N-well 318 from being forward biased and latch-up occurring. The back side of the first clamp device control capacitors 290 is connected to Vcc by N-channel switching devices 338 and 340 to pre-charge the first clamp device control capacitor 290. The gates of switching devices 340 and 340' are respectively cross-coupled to the second and first pre-charge capacitors 246' and 246 to control their operation. Similarly, a gate of the second clamp device 334' is connected to a second control circuit or device 319' including the second clamp control or gate capacitor 290' to control the operation of the second clamp device 334' to turn on the second clamp device 334' to connect the N-well 318 of the second pass device 302' to the second main pump capacitor 274' or to turn off the second clamp device 334' during which time the N-well 318 is connected to a node 336' to prevent forward biasing the N-well 318.

The nodes 336 and 336' of the clamp circuit 317 and 317' are coupleable to supply voltage Vcc by N-channel switching device 342 and by capacitors 344, 346 and 348 connected in parallel. The nodes 336 and 336' are also connected to first and second clamp devices 334 and 334' by N-channel switching devices 350 and 350'.

Figure 4:
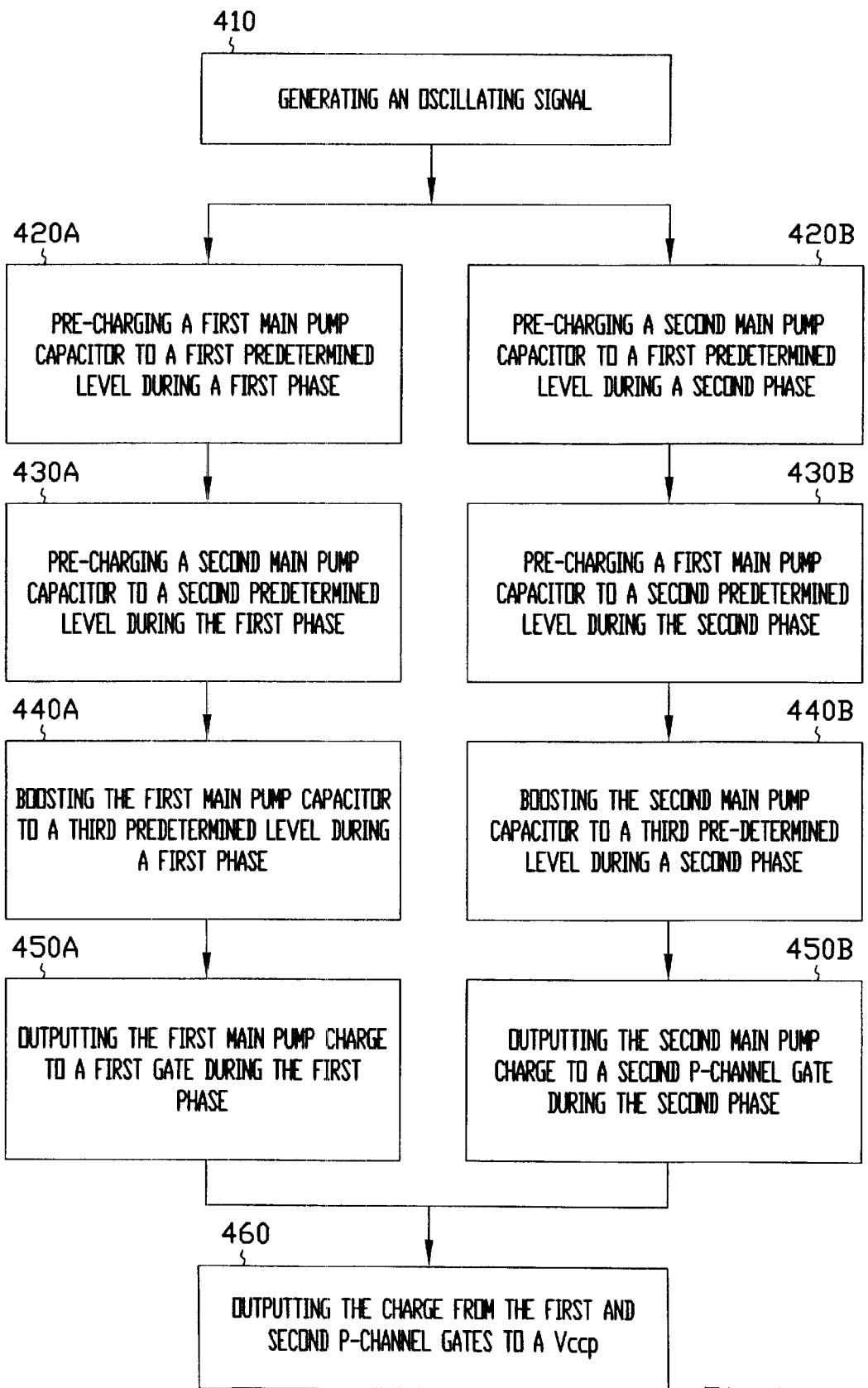
FIG. 4 is a flow chart illustrating a method of operation of the charge pump of the present invention.

The first and second primary phase generators 204 and 206 and the first and second secondary phase generators 208 and 210 generate a plurality of control or driver signals to control the operation of the charge circuit portion 202 of the charge pump 102. FIG. 4 is a flow diagram illustrating a method of operation of the charge pump circuit 102 in accordance with one embodiment of the present invention and FIGS. 5A and 5B illustrate an example of the phase or driver signals generated by the primary phase generators 204 and 206 and the secondary phase generators 208 and 210. The first step in the method of operating the charge pump 102 is to generate an oscillating signal in step 410 (FIG. 4). In one embodiment the oscillating signal is input to the first and second primary phase generators 206 and 208 for generating first and second phase signals or driver signals 510 and 520 (FIG. 5A) that are non-overlapping and crossing each other around their highest points 515 during a phase cycle of the oscillating signal 410. Then the first and second primary phase generators 206 and 208 further generate third and fourth phase or driver signals 550 and 560 (FIG. 5B) that are non-overlapping and crossing each other around their lowest points 535 during each phase cycle of the oscillating signals 410. The secondary phase generators 208 and 210 receive the first and second phase signals 510 and 520 from the primary phase generators 204 and 206 and generates a fifth and sixth phase or driver signals 530 and 540 similar to the first and second phase signals 510 and 520 and having a predetermined delay (ΔT) from the first and second phase signals 510 and 520. Intermediate signals from the primary phase generators 204 and 206 and the secondary phase generators 208 and 210 are combined to create additional phase or driver signals for controlling the operation of the pre-charge and charge storage portion 202 of the charge pump 102.

In the one embodiment of the present invention illustrated in FIG. 4, the first pre-boot capacitor 260 and associated driving circuitry receives first and second phase or driver signals 510 and 520 from the primary phase generators 204 and 206 during the first phase, and pre-boots or pre-charges a first main pump capacitor 274 to a first predetermined charge level during the first phase at step 420A. The second pre-boot capacitor 260' and associated driving circuitry receives third and fourth phase or signals 550 and 560 from the primary phase generators 204 and 206 during the second phase, and pre-boots or pre-charges the second main pump 274' to a first predetermined charge level during the second phase in step 420B. The first main pump pre-charge capacitor 246 receives a seventh phase signal from the first primary phase generator 204, and the first main pump capacitor 274 is further pre-charged by the first main pump pre-charge capacitor 246 during the second phase to a second predetermined charge level at step 430B. The second main pump pre-charge capacitor 246' receives an eighth phase or driver signal from the second primary phase generator 208, and the second main pump 274' is further pre-charged by the second main pump pre-charge capacitor 246' during the first phase to a second predetermined charge level at step 430A. Then in one embodiment the fifth phase or driver signal 530 from the first secondary phase generator 208 is input to boost the first main pump capacitor 274 to a third predetermined charge level in step 440A and the charge is output from the first main pump 274 during the first phase in step 450A. Then in this embodiment the sixth phase signal 540 from the second secondary phase generator 210 is input to boost the second main pump 274' to a third predetermined charge level in step 440B and a charge is output from the second main pump 274' during the second phase in step 450B. The charge from the first main pump 274 passes through the first pass gate or device 302 to provide the predetermined pump voltage $V_{ccp}$ during the first phase in step 460, and the charge from the second main pump 274' passes through the second pass gate 302' to provide the predetermined pump voltage $V_{ccp}$ during the second phase in step 460. The charge pump 102 is designed symmetrically, such that during a first phase the charge pump 102 provides a pump voltage $V_{ccp}$ using one-half of the charge pump circuit and during the second phase, $V_{ccp}$ is provided using the other-half of the charge pump circuit. This process repeats itself for every charge cycle and generally hides the pre-boot time required to pre-boot the first and second main pump capacitors 274 and 274'. As a result, the charge pump circuitry 102 can run at a faster cycle time resulting in the output of more charge for a given size of capacitor.

Figure 6A:
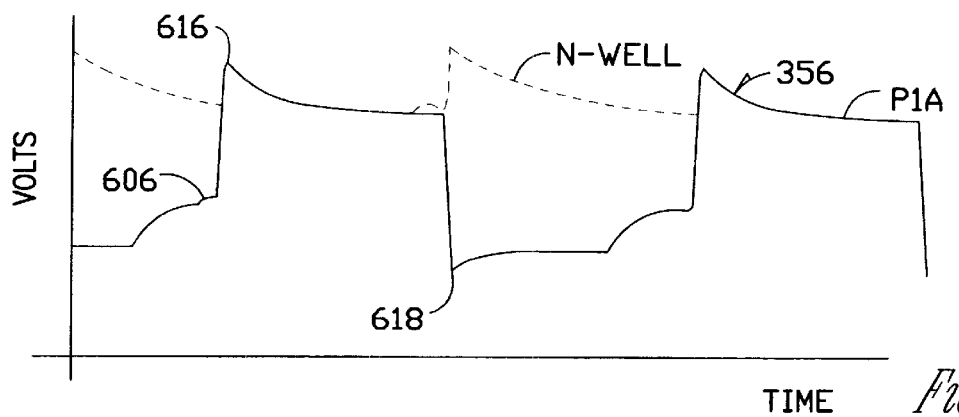
FIGS. 6A–6G are timing diagrams illustrating generally signals generated at various node points of a charge pump in accordance with the present invention.
Figure 6B:
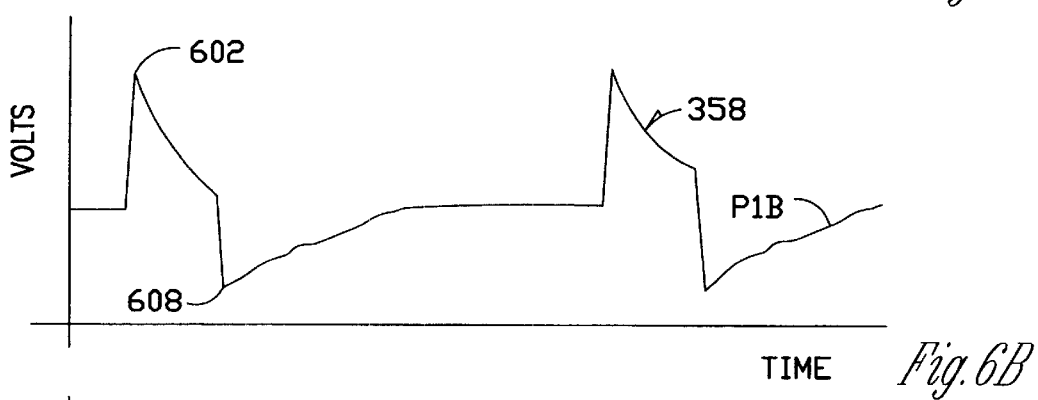
Figure 6C:
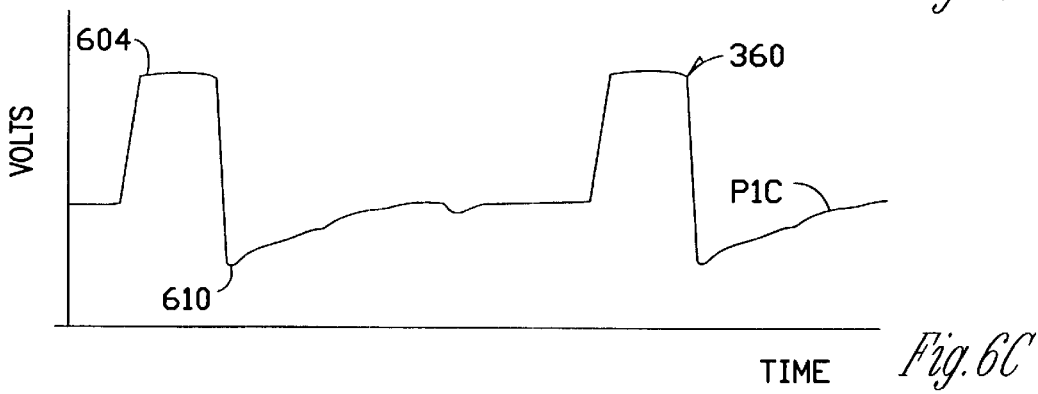
Figure 6D:
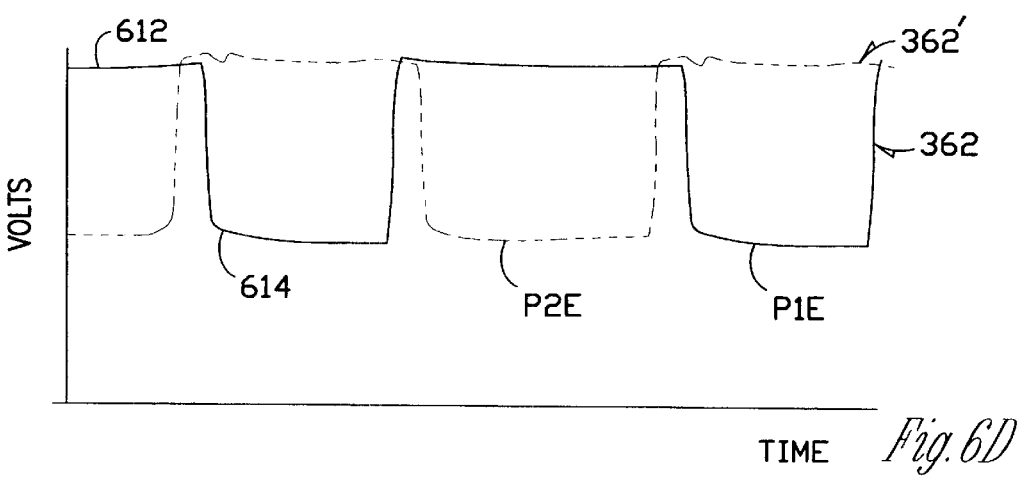
Figure 6E:
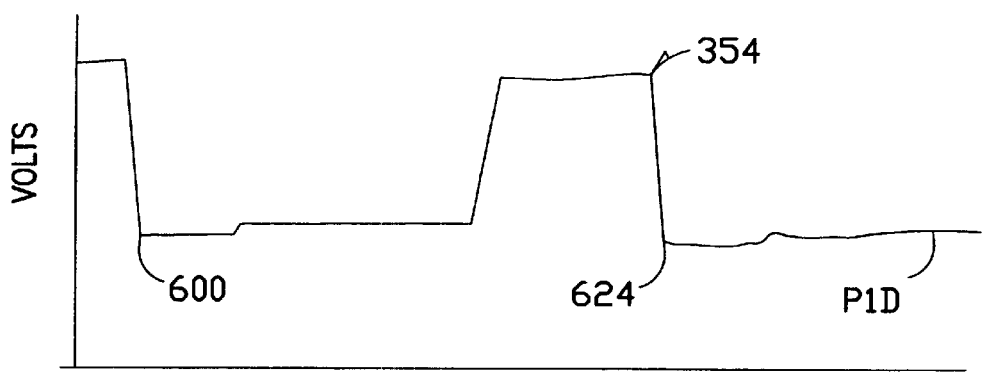
Figure 6F:
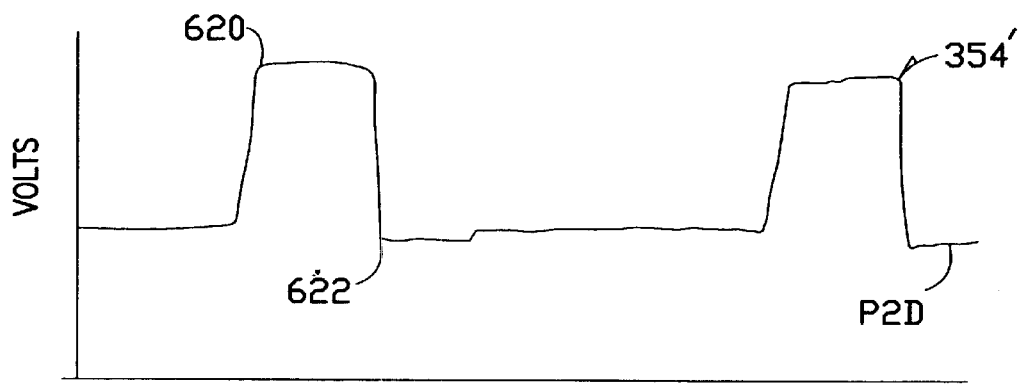
Figure 6G:
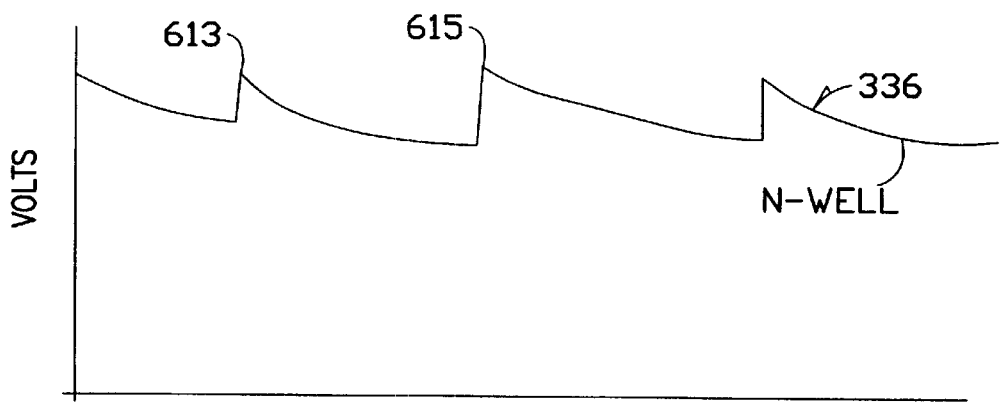

The operation of the charge pump 102 will now be described with reference to FIGS. 6A–G. FIG. 6A is a timing diagram at node 356 in FIG. 2B at the output of the first main pump capacitor 274 and is also designated as signal P1A. FIG. 6B is a timing diagram at node 358 in FIG. 2B at the output of the pre-boot capacitor 260 and is also designated as signal P1B. FIG. 6C is a timing diagram at node 360 in FIG. 2B at the output of the pre-boot gating capacitor 254 and is also designated as signal P1C. FIG. 6D is a timing diagram at nodes 362 and 362' at the outputs of the first and second clamp control device capacitors 290 and 290' and are also referred to as signals P1E and P2E, respectfully. FIGS. 6E and 6F are timing diagrams at nodes 354 and 354' at the output of the first and second pre-charge capacitors 246 and 246' and are also referred to as signals P1D and P2D, respectively. FIG. 6G is a timing diagram at node 336 showing the voltage on the N-well 318 of the pass device 302. The timing diagrams for the second or opposite phase at nodes 356', 358' and 360' in FIG. 2B are not shown because these waveforms track the timing diagrams of the first phase signals and are merely time shifted.

When the output signal P1D (FIG. 6E) of the first pre-charge capacitor 246 goes low at reference numeral 600, the output signal P1B (FIG. 6B) of the first pre-boot capacitor 260 goes high as shown at reference numeral 602. The output signal P1C (FIG. 6C) of the first pre-boot gating capacitor 254 at node 360 also goes high (reference numeral 604) to gate the first pre-boot capacitor 260 (output signal P1B) into the first main pump capacitor 274 (FIG. 6A). The first main pump capacitor 274 is pre-booted to a first voltage level (reference numeral 606 in FIG. 6A) by the first pre-boot capacitor 260 (output signal P1B in FIG. 6B). After the first pre-boot capacitor 260 (signal P1B) discharges into the first main pump capacitor 274 (FIG. 6A), the first pre-boot capacitor 260 is low (reference numeral 608 in FIG. 6B) and begins to be recharged by its associated charging circuitry including switching devices 306, 308 and 292. The pre-boot gating capacitor 254 (output signal P1C in FIG. 6C) is also discharged (reference numeral 610 in FIG. 6C) and begins to be recharged by its associated charging circuitry including switching devices 296 and 310.

In accordance with the present invention, the first clamp control capacitor 290 (signal P1E in FIG. 6D) is high (reference numeral 612) to inactivate or turn off the first clamp device 334 and to release the N-well 318 of the pass device 302 from the back side of the first main pump capacitor 274 when the first main pump capacitor 274 is charging (FIG. 6A reference numeral 606), and the first clamp control capacitor 290 goes low (reference numeral 614 in FIG. 6D) to activate or turn on the first clamp device 334 to clamp or connect the N-well 318 of the pass device 302 to the back side of the first main pump capacitor 274 (reference numeral 613 in FIG. 6G) before the pass device 302 is activated or turned on to couple the first main pump capacitor 274 to the output 220 of the charge pump 102 to provide the predetermined voltage. As previously discussed, clamping the N-well 318 of the pass device 302 to the back side of the first main pump capacitor 274 prevents the N-well 318 from forward biasing. When the clamp device 334 is inactivated, the N-well 318 of the pass device 302 is connected to the node 336 (reference numeral 615 in FIG. 6G) to apply a voltage level to the N-well 318 to prevent the N-well 318 from forward biasing and latching-up the pass device 302 and the charge pump 102.

When the first main pump capacitor 274 is fully charged (reference numeral 616 in FIG. 6A) to provide the predetermined voltage to the output 220 of the charge pump 102, the second main pump capacitor 274' will be opposite in phase and will be at a low (not shown). The second main pump capacitor 274' then gates or activates the P-channel pass device 302 to connect the first main pump capacitor 274 to the output 220 to discharge the first main pump capacitor 274 (reference numeral 618 in FIG. 6A).

When the first main pump capacitor 274 fires or discharges into the output 220 of the charge pump 102, the second pre-charge capacitor 246' is charged and goes high (reference numeral 620 in FIG. 6F). The second pre-charge capacitor 246' goes low at reference numeral 622 in FIG. 6F to begin the second phase pre-charging cycle of the second main pump capacitor 274' similar to that just described with respect to the first main pump capacitor 274. The second main pump capacitor 274' and associated pre-charge and pre-boot capacitors and associated circuitry then follow the same process as that just described with respect to first main pump capacitor 274. Thus, during a second phase, while the second main pump capacitor 274' is being charged, the first main pump capacitor 274 will be discharging through the output 214 of the charge pump 102 and then the first phase begins again while the second main pump capacitor 274' discharges or fires. The first pre-charge capacitor 246 will go low again(reference numeral 624 in FIG. 6E) to begin the process of charging the first main pump capacitor 274 again.

Figure 7:
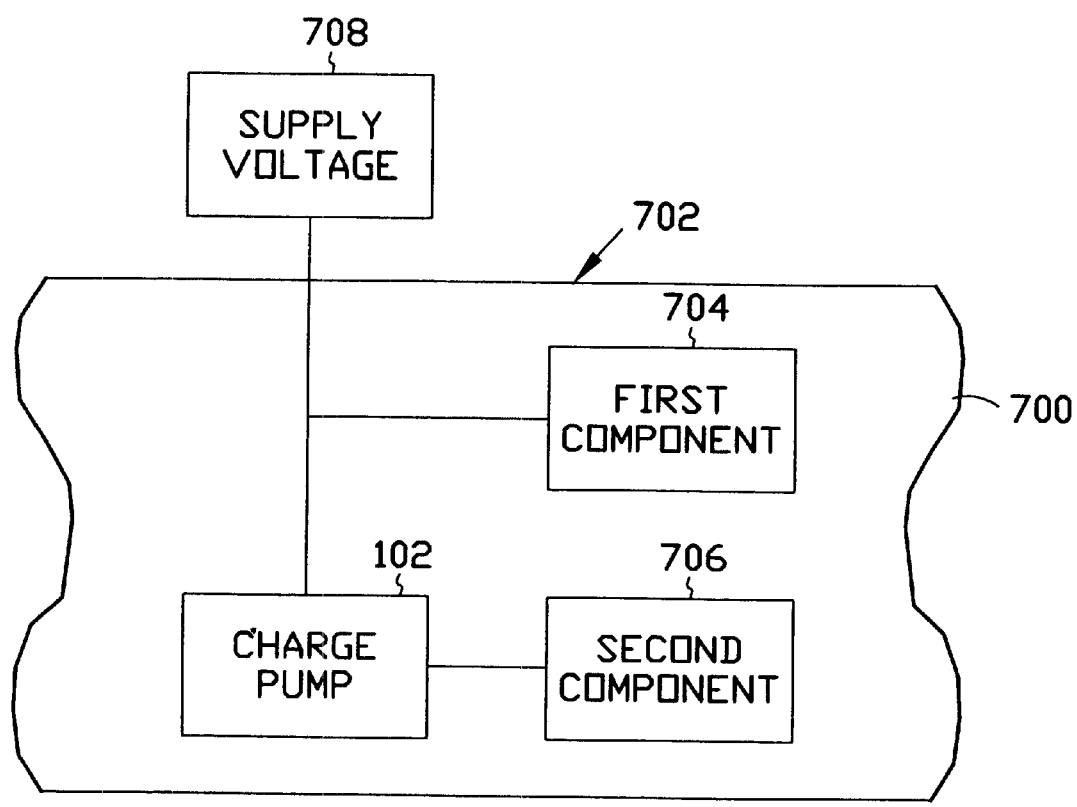
FIG. 7 is a partial block schematic of an integrated circuit in which an electronic system is formed that utilizes a charge pump in accordance with the present invention.

FIG. 7 illustrates one example of an application of the charge pump 102 of the present invention. FIG. 7 shows a partial view of an integrated circuit 700 in which an electronic system 702 may be formed. Only a portion of the electronic system 702 is shown in FIG. 7. The electronic system 702 includes a first component 704 and at least a second component 706. The first component 704 is coupled to an external supply voltage 708 and operates at substantially the voltage level provided by the supply voltage 708. The second component 706 operates at a higher voltage level than the supply voltage 708 and may also require a different voltage polarity. To provide the higher voltage level, a charge pump 102 in accordance with the present invention is connected between the supply voltage 708 and the second component 706. The system 702 may be a computer system or any part thereof such as a display, memory module, processor or the like, or the system 702 may be a battery operated device such as a cellular telephone, laptop computer, handheld electronic organizer or other electronic device.

Figure 8:
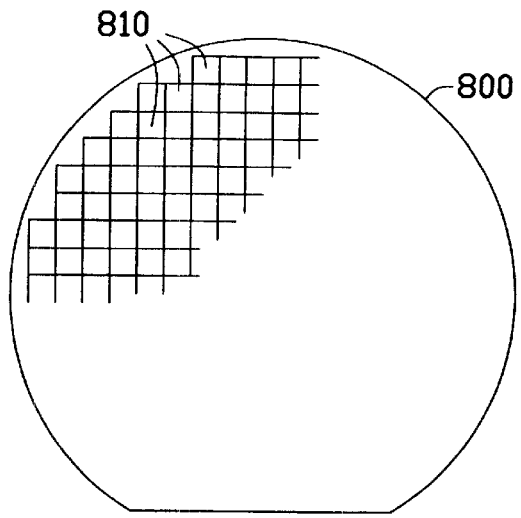
FIG. 8 is a top view of a wafer or substrate containing semiconductor dies in accordance with an embodiment of the present invention.

With reference to FIG. 8, in one embodiment, a semiconductor die 810 is produced from a silicon wafer 800. A die 810 is an individual pattern, typically rectangular, on a substrate that contains circuitry to perform a specific function. A semiconductor wafer 800 will typically contain a repeated pattern of such dies 810 containing the same functionality. Die 810 may contain circuitry for the inventive charge pump 102, as discussed above. Die 810 may further contain additional circuitry to extend to such complex devices as a monolithic processor with multiple functionality. Die 810 is typically packaged in a protective casing (not shown) with leads extending therefrom (not shown) providing access to the circuitry of the die 810 for unilateral or bilateral communication and control.

Figure 9:
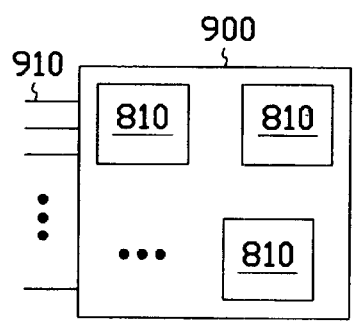
FIG. 9 is a block schematic diagram of an exemplary circuit module in accordance with another embodiment of the present invention.

As shown in FIG. 9, two or more dies 810 may be combined, with or without protective casing, into a circuit module 900 to enhance or extend the functionality of an individual die 810. Circuit module 900 may be a combination of dies 810 representing a variety of functions, or a combination of dies 810 containing the same functionality. Some examples of a circuit module 900 include memory modules, device drivers, power modules, communication modems, processor modules and application-specific modules and may include multi-layer, multi-chip modules. Circuit module 900 may be a sub-component of a variety of electronic systems, such as a clock, a television, a cell phone, a personal computer, an automobile, an industrial control system, an aircraft and others. Circuit module 900 will have a variety of leads 910 extending therefrom providing unilateral or bilateral communication and control.

Figure 10:
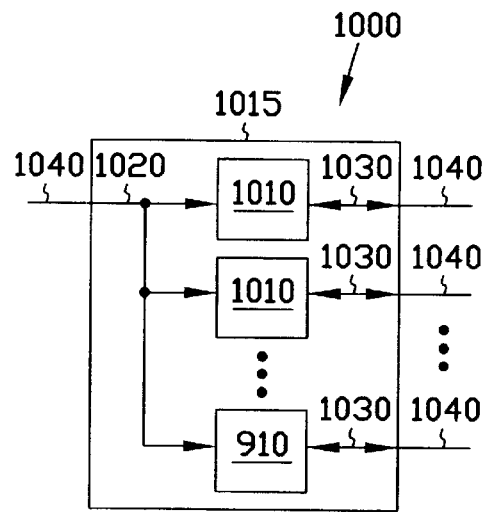
FIG. 10 is a block schematic diagram of an exemplary memory module in accordance with the present invention.

FIG. 10 shows one embodiment of a circuit module as memory module 1000 containing circuitry for the inventive charge pump 102. Memory module 1000 generally depicts a Single In-line Memory Module (SIMM) or Dual In-line Memory Module (DIAM). A SIMM or DIAM is generally a printed circuit board (PCB) or other support containing a series of memory devices. While a SIMM will have a single in-line set of contacts or leads, a DIAM will have a set of leads on each side of the support with each set representing separate I/O signals. Memory module 1000 contains multiple memory devices 1010 contained on support 1015, the number depending upon the desired bus width and the desire for parity. Memory module 1000 may contain memory devices 1010 on both sides of support 1015. Memory module 1000 accepts a command signal from an external controller (not shown) on a command link 1020 and provides for data input and data output on data links 1030. The command link 1020 and data links 1030 are connected to leads 1040 extending from the support 1015. Leads 1040 are shown for conceptual purposes and are not limited to the positions shown in FIG. 10.

Figure 11:
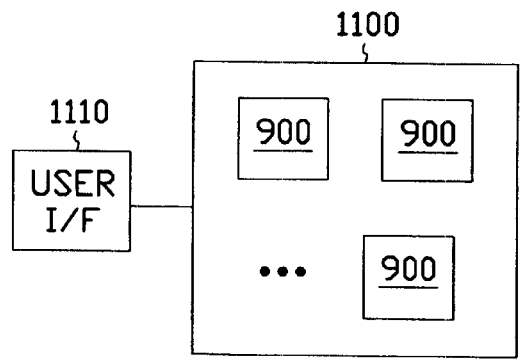
FIG. 11 is a block schematic diagram of an exemplary electronic system in accordance with the present invention.

FIG. 11 shows an electronic system 1100 containing one or more circuit modules 900 as described above containing the novel charge pump 102. Electronic system 1100 generally contains a user interface 1110. User interface 1110 provides a user of the electronic system 1100 with some form of control or observation of the results of the electronic system 1100. Some examples of user interface 1110 include the keyboard, pointing device, monitor and printer of a personal computer; the tuning dial, display and speakers of a radio; the ignition switch and gas pedal of an automobile; and the card reader, keypad, display and currency dispenser of an automated teller machine. User interface 1110 may further describe access ports provided to electronic system 1100. Access ports are used to connect an electronic system to the more tangible user interface components previously exemplified. One or more of the circuit modules 900 may be a processor providing some form of manipulation, control or direction of inputs from or outputs to user interface 1110, or of other information either preprogrammed into, or otherwise provided to, electronic system 1100. As will be apparent from the lists of examples previously given, electronic system 1100 will often contain certain mechanical components (not shown) in addition to the circuit modules 900 and user interface 1110. It will be appreciated that the one or more circuit modules 900 in electronic system 1100 can be replaced by a single integrated circuit. Furthermore, electronic system 1100 may be a sub-component of a larger electronic system.

Figure 12:
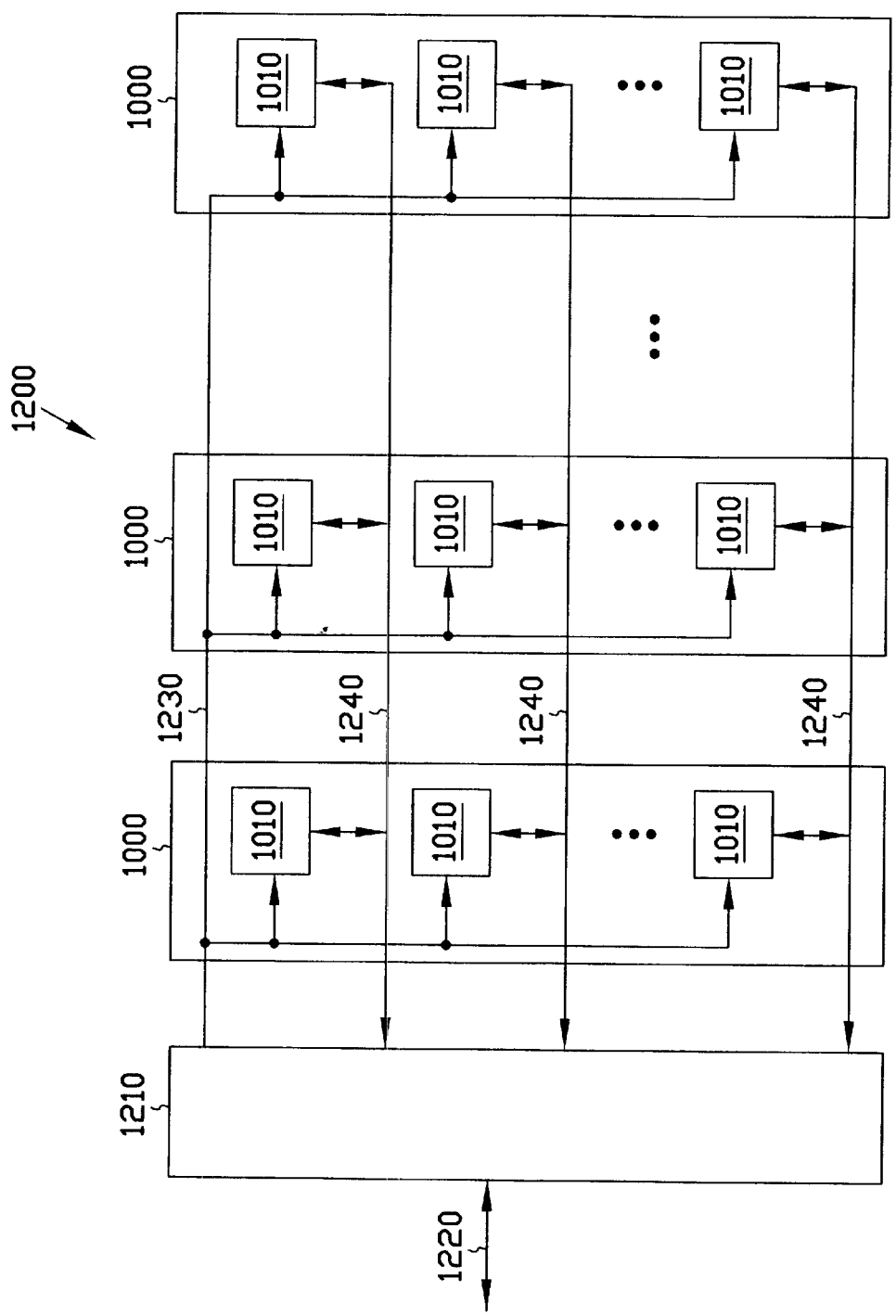
FIG. 12 is a block schematic diagram of an exemplary memory system in accordance with the present invention.

FIG. 12 shows one embodiment of an electronic system as memory system 1200. Memory system 1200 contains one or more memory modules 1000 as described above including the charge pump 102 in accordance with the present invention and a memory controller 1210 that may also include circuitry for the inventive charge pump 102. Memory controller 1210 provides and controls a bidirectional interface between memory system 1200 and an external system bus 1220. Memory system 1200 accepts a command signal from the external bus 1220 and relays it to the one or more memory modules 1000 on a command link 1230. Memory system 1200 provides for data input and data output between the one or more memory modules 1000 and external system bus 1220 on data links 1240.

Figure 13:
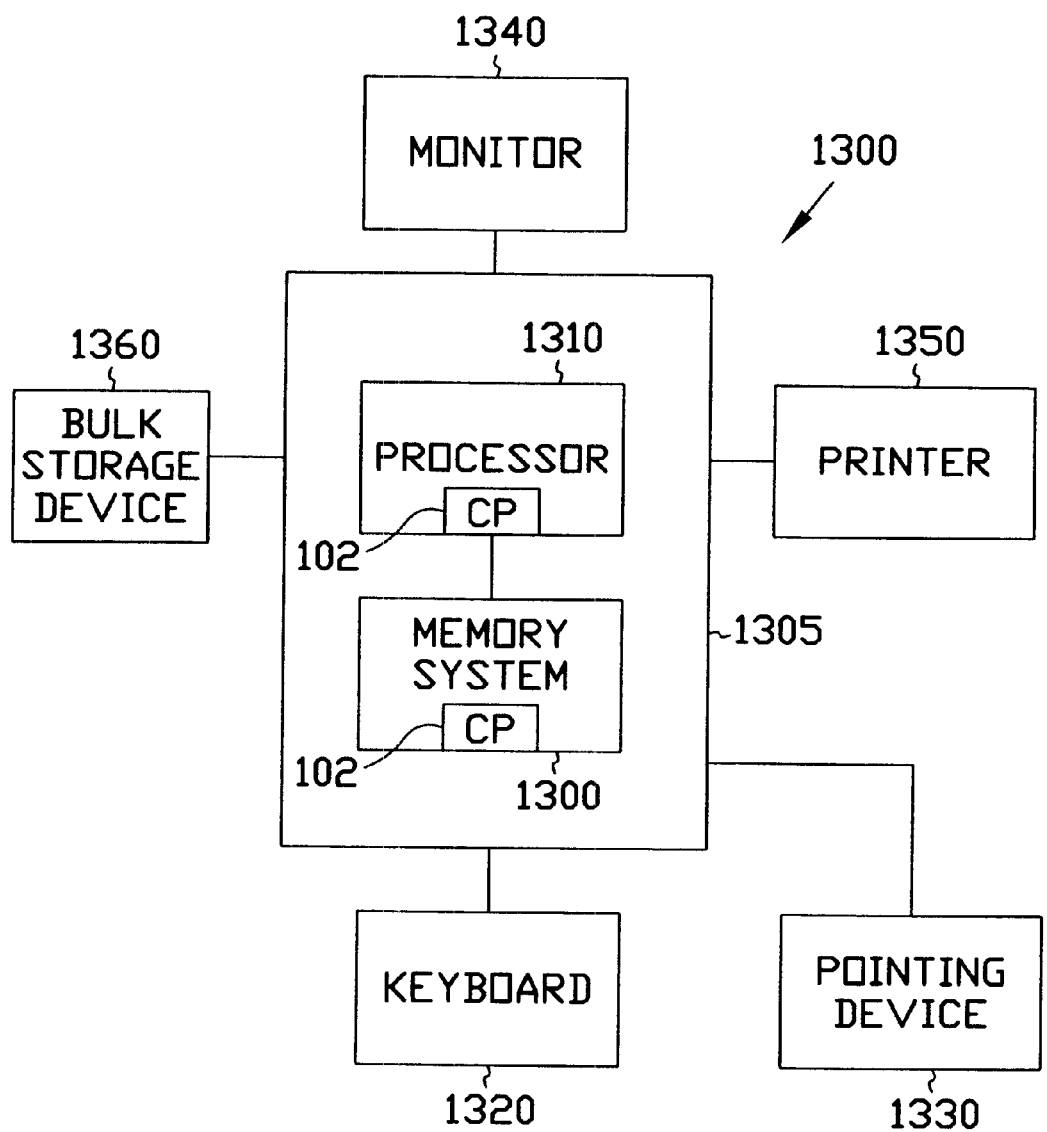
FIG. 13 is a block schematic diagram of an exemplary computer system in accordance with the present invention.

FIG. 13 shows a further embodiment of an electronic system as a computer system 1300. Computer system 1300 contains a processor 1310 and a memory system 1200 housed in a computer unit 1305. Computer system 1300 is but one example of an electronic system containing another electronic system, i.e. memory system 1200, as a sub-component. Computer system 1300 optionally contains user interface components. Depicted in FIG. 13 are a keyboard 1320, a pointing device 1330, a monitor 1340, a printer 1350 and a bulk storage device 1360. It will be appreciated that other components are often associated with computer system 1300 such as modems, device driver cards, additional storage devices, etc. It will further be appreciated that the processor 1310 and memory system 1200 of computer system 1300 can be incorporated on a single integrated circuit. Such single package processing units reduce the communication time between the processor 1310 and the memory system 1200. Any of the components of the system 1300 may operate at a voltage different from a system voltage and therefore require the voltage charge pump 102 of the present invention to provide the proper level of voltage. The processor 1310 and memory system 1200 may contain voltage pumps 102 to provide different levels and polarities of voltage for operation of the different components in the processor 1310 and memory system 1200.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A charge pump, comprising:
   at least one main pump capacitor;
   a pass device coupled to the at least one main pump capacitor; and
   a circuit to prevent a latch-up condition in the pass device, wherein the circuit to prevent the latch-up condition includes:
      a first clamp transistor coupled between a well of the pass device and the at least one main pump capacitor, wherein the first clamp gate transistor includes a first state that electrically releases the well of the pass device from the at least one first main pump capacitor and a second state that electrically connects the well of the pass device to the at least one main pump capacitor; and
      a first clamp gate capacitor connected to a gate of the first clamp transistor to control operation of the first clamp transistor.

2. A charge pump, comprising:
   a plurality of phase generators;
   first and second pre-boot capacitors coupled to the plurality of phase generators;
   first and second main pump capacitors coupled to the plurality of phase generators, and the first and second pre-boot capacitors, respectively;
   first and second pass devices coupled to the first and second main pump capacitors, respectively; and
   a circuit to prevent latch-up of the first and second pass devices, wherein the circuit to prevent the latch-up includes:
      a first clamp transistor coupled between a well of the first pass device and the first main pump capacitor, wherein the first clamp gate transistor includes a first state that electrically releases the well of the first pass device from the first main pump capacitor and a second state that electrically connects the well of the first pass device to the first main pump capacitor;
      a first clamp gate capacitor connected to a gate of the first clamp transistor to control operation of the first clamp transistor;
      a second clamp transistor coupled between a well of the second pass device and the second main pump capacitor, wherein the second clamp gate transistor includes a third state that electrically releases the well of the second pass device from the second main pump capacitor and a fourth state that electrically connects the well of the second pass device to the second main pump capacitor; and
      a second clamp gate capacitor connected to a gate of the second clamp transistor to control operation of the second clamp transistor.

3. The charge pump of claim 2, wherein the first and second main pump capacitors are pre-booted to a first predetermined level by the first and second pre-boot capacitors during a first phase and a second phase provided by the plurality of phase generators, respectively, wherein the first predetermined level is boosted to a second predetermined level in response to the plurality of phase generators during a first and a second phase provided by the plurality of phase generators, respectively, wherein the second predetermined level is boosted to a third predetermined level in response to the plurality of phase generators during the first and second phases, respectively, and wherein the third predetermined level is transferred to the first and a second pass devices, during the first and second phases, respectively.

4. A charge pump, comprising:
a plurality of phase generators;
first and second pre-boot capacitors coupled to the plurality of phase generators;
first and second main pump capacitors coupled to the plurality of phase generators, and the first and second pre-boot capacitors respectively;
first and second pass devices coupled to the first and second main pump capacitors, respectively; and
a circuit to prevent forward biasing of a well of the first and second pass devices,
wherein the circuit to prevent forward biasing of a well of the first and second pass devices comprises:
a first clamp transistor coupled between a well of the first pass device and the first main pump capacitor;
a first clamp gate capacitor to control operation of the first clamp transistor;
a second clamp transistor coupled between a well of the second pass device and the second main pump capacitor; and
a second clamp gate capacitor to control operation of the second clamp transistor.

5. A charge pump, comprising:
an output;
a first main pump capacitor;
a second main pump capacitor;
a first n-well pass transistor coupled between the first main pump capacitor and the output of the charge pump;
a second n-well pass transistor coupled between the second main pump capacitor and the output of the charge pump;
a first clamp transistor coupled to the n-well of the first pass transistor;
a second clamp transistor coupled to the n-well of the second pass transistor;
a first clamp capacitor connected to the gate of the first clamp transistor, wherein the first clamp capacitor controls operation of the first clamp transistor to prevent forward biasing of the first n-well pass transistor; and
a second clamp capacitor connected to the gate of the second clamp transistor, wherein the second clamp capacitor controls operation of the second clamp transistor to prevent forward biasing of the second n-well pass transistor.

6. The charge pump of claim 5, wherein the first clamp capacitor is adapted to turn the first clamp transistor on before the first n-well pass transistor electrically connects the first main pump capacitor to the output.

7. The charge pump of claim 6, wherein the second clamp capacitor is adapted to turn the second clamp transistor on before the second n-well pass transistor electrically connects the second main pump capacitor to the output.

8. A charge pump, comprising:
an output;
a first main pump capacitor;
a second main pump capacitor;
a first n-well pass transistor coupled between the first main pump capacitor and the output of the charge pump;
a second n-well pass transistor coupled between the second main pump capacitor and the output of the charge pump;
a first clamp transistor coupled to the n-well of the first pass transistor to prevent the n-well of the first pass transistor from being forward biased;
a second clamp transistor coupled to the n-well of the second pass transistor to prevent the n-well of the second pass transistor from being forward biased; and
at least one control circuit to control operation of the first and second clamp transistors, wherein the at least one control circuit includes at least one clamp capacitor adapted to control operation of at least one of the first clamp transistor and the second clamp transistor.

9. A charge pump, comprising:
a first main pump capacitor;
a second main pump capacitor;
a first n-well pass transistor coupled between the first main pump capacitor and an output of the charge pump;
a second n-well pass transistor coupled between the second main pump capacitor and the output of the charge pump;
a first clamp transistor coupled to the n-well of the first pass transistor to prevent the n-well of the first pass transistor from being forward biased;
a first clamp gate capacitor circuit to control operation of the first clamp transistor;
a second clamp transistor coupled to the n-well of the second pass transistor to prevent the n-well of the second pass transistor from being forward biased; and
a second clamp gate capacitor circuit to control operation of the second clamp transistor.

10. A charge pump, comprising:
a charge storage device;
a pre-charge circuit to charge the charge storage device to a charge level to provide a predetermined output voltage from the charge pump;
a pass device coupled between the charge storage device and an output of the charge pump; and
a circuit to prevent a latch-up condition in the pass device, wherein the circuit to prevent the latch-up condition includes a transistor connected to the pass device and a capacitor connected to the transistor, the capacitor being adapted to control the transistor and to turn the transistor on before the pass device electrically connects the charge storage device to the output.

11. The charge pump of claim 10, wherein the pre-charge circuit comprises
a plurality of phase generators; and
a plurality of pre-boot capacitors coupled to the plurality of phase generators to pre-charge the charge storage device to the charge level to provide the predetermined output voltage.

12. The charge pump of claim 11, wherein the capacitor of the circuit to prevent the latch-up condition is connected to the plurality of phase generators to control charging of the capacitor.

13. A charge pump, comprising:
  a charge storage device;
  a pre-charge circuit to charge the charge storage device to a charge level to provide a predetermined output voltage from the charge pump;
  a pass device coupled between the charge storage device and an output of the charge pump; and
  a circuit to prevent a well of the pass device from being forward biased, wherein the circuit to prevent the well of the pass device from being forward biased includes a transistor connected to the well of the pass device and a capacitor connected to the transistor, the capacitor being adapted to control the transistor and to turn the transistor on before the pass device electrically connects the charge storage device to the output.

14. A charge pump, comprising:
  a charge storage device;
  a pre-charge circuit to charge the charge storage device to a charge level to provide a predetermined output voltage from the charge pump;
  a pass device coupled between the charge storage device and an output of the charge pump; and
  a circuit to clamp a well of the pass device to the charge storage device before the charge storage device is connected to the output of the charge pump and to release the well of the pass device from the charge storage device before the charge storage device is charged.

15. A charge pump, comprising:
  a plurality of phase generators;
  a first main pump capacitor;
  a second main pump capacitor;
  a pre-charge capacitor circuit coupled between each of the first and second main pump capacitors and the plurality of phase generators to pre-charge each of the first and second main pump capacitors to a predetermined charge level;
  a pass circuit to control connection of the first main pump capacitor and the second main pump capacitor to an output of the charge pump; and
  a circuit to prevent a latch-up condition in the pass circuit, wherein the circuit to prevent a latch-up condition is adapted, in a first phase, to clamp a well in the pass circuit to the first main pump capacitor before the first main pump capacitor is connected to the output of the charge pump and to release the well of the pass circuit from the first main pump capacitor before the first main pump capacitor is charged.

16. The charge pump of claim 15, wherein the circuit to prevent a latch-up condition is adapted, in a second phase, to clamp a second well in the pass circuit to the second main pump capacitor before the second main pump capacitor is connected to the output of the charge pump and to release the well of the pass circuit from the second main pump capacitor before the second main pump capacitor is charged.

17. A charge pump, comprising:
  a charge storage device;
  a pre-charge circuit to charge the charge storage device to a charge level to provide a predetermined output voltage from the charge pump;
  a pass device to connect the charge storage device to an output of the charge pump after the charge storage device is pre-charged to provide the predetermined output voltage; and
  a circuit to clamp a well of the pass device to a node of the charge pump having a voltage to prevent forward biasing of the well, wherein the circuit to clamp the well of the pass device includes a clamp transistor having a source/drain connected to the node and a gate connected to a clamp device control signal from a capacitor and a plurality of phase generators.

18. A charge pump, comprising:
  a charge storage device;
  a pre-charge circuit to charge the charge storage device to a charge level to provide a predetermined output voltage from the charge pump;
  an n-well pass transistor to connect the charge storage device to an output of the charge pump after the charge storage device is pre-charged to provide the predetermined output voltage; and
  a circuit to clamp the n-well of the pass transistor to a voltage level within the charge pump to prevent the n-well of the pass transistor from being forward biased, wherein the circuit to clamp the n-well of the pass transistor includes a clamp transistor having a source/drain connected to the n-well of the pass transistor and a gate connected to a clamp device control signal from a capacitor and a plurality of phase generators.

19. A charge pump, comprising:
  a charge storage device;
  a pre-charge circuit to charge the charge storage device to a charge level to provide a predetermined output voltage from the charge pump;
  a pass device coupled between the charge storage device and an output of the charge pump;
  a circuit to prevent a latch-up condition in the pass device, wherein the circuit to prevent the latch-up condition includes a transistor connected to the pass device and a capacitor connected to the transistor, the capacitor being adapted to control the transistor, and the transistor being adapted to turn the transistor on before the pass device electrically connects the charge storage device to the output; and
  at least one control circuit to control pre-charging of the charge storage device and coupling of the charge storage device to the output of the charge pump.

20. A charge pump, comprising:
  a charge storage device;
  a pre-charge circuit to charge the charge storage device to a charge level to provide a predetermined output voltage from the charge pump;
  a pass device coupled between the charge storage device and an output of the charge pump;
  a circuit to clamp a well of the pass device to a node of the charge pump having a voltage to prevent forward biasing of the well;
  at least one phase generator to generate a plurality of signals to control pre-charging of the charge storage device and coupling the charge storage device to the output of the charge pump; and
  wherein the circuit to clamp the well of the pass device includes a clamp transistor having a source/drain connected to the node and a gate connected to a clamp device control signal from a capacitor and the at least one phase generator.

21. A charge pump, comprising:

at least one main charge storage device;

at least one pre-charge circuit to charge the at least one main charge storage device to a charge level to provide a predetermined output voltage from the charge pump;

at least one pass device between the at least one main charge storage device and an output of the charge pump;

at least one circuit to clamp a well of the at least one pass device to a node of the charge pump having a voltage to prevent forward biasing of the well;

at least one control circuit to control operation of the at least one pre-charge circuit and the at least one circuit to clamp the well of the at least one pass device; and wherein the circuit to prevent the well of the pass device from being forward biased includes a transistor connected to the well of the pass device and a capacitor connected to the transistor, the capacitor being adapted to control the transistor, and the transistor being adapted to turn the transistor on before the pass device electrically connects the charge storage device to the output.

22. A charge pump, comprising:

a first main pump capacitor;

a second main pump capacitor;

a first pass transistor coupled between the first main pump capacitor and an output of the charge pump;

a second pass transistor coupled between the second main pump capacitor and the output of the charge pump; and a circuit to clamp a well of the first pass transistor and a well the second pass transistor respectively to the first main pump capacitor and the second main pump capacitor before each of the first and second main pump capacitors are connected to the output of the charge pump and to release the well of the first pass transistor and the well of the second pass transistor respectively from the first main pump capacitor and the second main pump capacitor before each of the first and second main pump capacitors are charged.

23. A charge pump, comprising:

at least one main pump capacitor;

a pass device coupled to the at least one main pump capacitor; and a circuit to clamp a well of the pass device to the at least one main pump capacitor before the at least one main pump capacitor is discharged through an output of the charge pump and to release the well of the pass device from the at least one main pump capacitor before the at least one main pump capacitor is charged.

24. A charge pump, comprising:

a plurality of phase generators;

first and second pre-boot capacitors coupled to the plurality of phase generators;

first and second main pump capacitors coupled to the plurality of phase generators, and the first and second pre-boot capacitors, respectively;

first and second pass devices coupled to the first and second main pump capacitors, respectively, wherein the first and second main pump capacitors are successively pre-charged to higher charge levels to output a higher voltage than an input voltage; and a circuit to prevent latch-up of the first and second pass devices, wherein the circuit to prevent latch-up includes:

a first clamp transistor coupled between a well of the first pass device and the first main pump capacitor;

a first clamp gate capacitor to control operation of the first clamp transistor;

a second clamp transistor coupled between a well of the second pass device and the second main pump capacitor; and a second clamp gate capacitor to control operation of the second clamp transistor.

25. The charge pump of claim 24, wherein the plurality of phase generators control charging the first clamp gate capacitor and the second gate capacitor.

26. A charge pump, comprising:

an oscillator to generate a first and a second phase signal during a phase cycle;

a primary phase generator coupled to the oscillator;

a secondary phase generator coupled to the primary phase generator;

first and second pre-boot capacitors coupled to the primary phase generator;

first and second main pump capacitors coupled to the secondary phase generator, and the first and second pre-boot capacitors, respectively;

first and second p-channel devices coupled to the first and second main pump capacitors, respectively; and a circuit to couple an n-well of each of the first and second p-channel devices to a voltage to prevent each of the n-wells from being forward biased; and wherein the first and second main pump capacitors are charged to a predetermined level to output a higher voltage than an input voltage.

27. A charge pump, comprising:

a plurality of phase generators;

first and second pre-boot capacitors coupled to the plurality of phase generators;

first and second main pump capacitors coupled to the plurality of phase generators, and the first and second pre-boot capacitors, respectively;

first and second pass devices coupled to the first and second main pump capacitors, respectively;

a circuit to prevent forward biasing of a well of the first and second pass devices;

first and second main pump pre-charge capacitors, wherein:

the first pre-boot capacitor pre-boots the first main pump to a first predetermined level during a first phase in response to receiving a second and a third phase signal from the plurality of phase generators;

the second pre-boot capacitor pre-boots the second main pump to the first predetermined level during a second phase in response to receiving a first and a fourth phase signals from the plurality of phase generators;

the first main pump pre-charge capacitor pre-charges the first main pump to a second predetermined level during the second phase in response to the first main pump pre-charge capacitor receiving a seventh phase signal from the plurality of phase generators;

the second main pump pre-charge capacitor pre-charges the second main pump capacitor to the second predetermined level during the first phase in response to the second main pump pre-charge capacitor receiving an eighth phase signal from the plurality of phase generators;

the first main pump is charged to a third predetermined level in response to receiving a fifth phase signal from the plurality of phase generators and a charge is outputted from the first main pump during the first phase; and the second main pump is charged to a third predetermined level in response to receiving a sixth phase signal from the plurality of phase generators and another charge is outputted from the second main pump during the second phase.

28. An electronic system, comprising:
at least one component operating at a predetermined voltage higher or more negative than a supply voltage; and
a charge pump coupled to the at least one component to generate the predetermined voltage, said charge pump including:
  a charge storage device;
  a pre-charge circuit to pre-charge the charge storage device to provide the predetermined voltage;
  a pass device to connect the charge storage device to an output of the charge pump; and
  a circuit to prevent a well of the pass device from being forward biased, wherein the circuit to prevent the well of the pass device from being forward biased includes a transistor connected to the well of the pass device and a capacitor connected to the transistor, the capacitor being adapted to control the transistor and to turn the transistor on before the pass device electrically connects the charge storage device to the output.

29. The electronic system of claim 28, wherein the predetermined voltage is derived from the supply voltage.

30. An electronic system, comprising:
at least one component operating at a predetermined voltage with a larger amplitude than a supply voltage; and
a charge pump to generate the predetermined voltage, said charge pump including:
  a charge storage device;
  a pre-charge circuit to pre-charge the charge storage device to provide the predetermined voltage;
  a pass device coupled between the charge storage device and an output of the charge pump; and
  a circuit to prevent latch-up of the pass device, wherein the circuit to prevent the latch-up includes a transistor connected to the pass device and a capacitor connected to the transistor, the capacitor being adapted to control the transistor and to turn on the transistor before the pass device electrically connects the charge storage device to the output.

31. An electronic system, comprising:
at least one component operating at a predetermined voltage with a larger amplitude than a system voltage; and
a charge pump to generate the predetermined voltage, said charge pump including:
  a plurality of phase generators;
  a first main pump capacitor;
  a second main pump capacitor;
  a pre-charge circuit coupled between each of the first and second main pump capacitors and the plurality of phase generators to pre-charge each of the first and second main pump capacitors to a predetermined charge level;
  a first pass device coupled between the first main pump capacitor and an output of the charge pump;
  a second pass device coupled between the second main pump capacitor and the output of the charge pump; and
  a circuit to couple a well of the each of the first and second pass devices respectively to the first main pump capacitor and the second main pump capacitor before each of the main pump capacitors is connected to the output of the charge pump and to release the well of each of the first and second pass devices before each of the first and second main pump capacitors is charged.

32. An electronic system, comprising:
at least one component operating at a predetermined voltage higher or more negative than a supply voltage; and
a charge pump to generate the predetermined voltage, said charge pump including:
  a plurality of phase generators;
  first and second pre-boot capacitors coupled to the plurality of phase generators; first and second main pump capacitors coupled to the plurality of phase generators, and the first and second pre-boot capacitors, respectively;
  first and second pass devices coupled respectively between the first and second main pump capacitors and the output of the charge circuit; and
  a circuit to couple a well of each of the first and second pass devices to a voltage to prevent forward biasing of the well of each of the first and second pass devices.

33. An electronic system, comprising:
at least one component operating at a predetermined voltage higher or more negative than a supply voltage; and
a charge pump to generate the predetermined voltage, said charge pump including:
  a plurality of phase generators;
  a first main pump capacitor;
  a second main pump capacitor;
  a plurality of pre-charge capacitor circuits coupled respectively between each of the first and second main pump capacitors and the plurality of phase generators to pre-charge each of the first and second main pump capacitors to a charge level to provide the predetermined output voltage from the charge pump;
  a pass device to connect each of the first and second main pump capacitors to an output of the charge pump; and
  a circuit to clamp a well of the pass device to a voltage level within the charge pump to prevent the well of the pass device from being forward biased.

34. An electronic system, comprising:
at least one component operating at a predetermined voltage higher or more negative than a supply voltage; and
a charge pump to generate the predetermined voltage, said charge pump including:
  a plurality of phase generators;
  a first main pump capacitor;
  a second main pump capacitor;
  a plurality of pre-charge capacitor circuits coupled respectively between each of the first and second main pump capacitors and the plurality of phase generators to pre-charge each of the first and second main pump capacitors to a charge level to provide the predetermined voltage at an output of the charge pump;
  a first pass transistor coupled between the first main pump capacitor and the output of the charge pump;

a second pass transistor coupled between the second main pump capacitor and the output of the charge pump;
a first clamp transistor coupled to the well of the first pass transistor; and
a second clamp transistor coupled to the well of the second pass transistor.

35. An electronic system, comprising:
at least one component operating at a predetermined voltage higher amplitude than a supply voltage; and
a charge pump to generate the predetermined voltage, said charge pump including:
at least one main charge storage device;
at least one pre-charge circuit to charge the at least one main charge storage device to a charge level to provide a predetermined output voltage from the charge pump;
at least one pass device between the at least one main charge storage device and an output of the charge pump; and
at least one circuit to clamp a well of the at least one pass device to a node of the charge pump having a voltage to prevent forward biasing of the well, wherein the at least one circuit to clamp the well of the at least one pass device includes a clamp transistor having a source/drain connected to the node and a gate connected to a clamp device control signal from a capacitor and a plurality of phase generators.

36. A computer system, comprising:
a processor;
a memory system coupled to the processor; and
a charge pump coupled to at least one of the processor and the memory system, wherein the charge pump includes:
a charge storage device;
a pre-charge circuit to pre-charge the charge storage device to provide a predetermined voltage;
a pass device coupled between the charge storage device and an output of the charge pump; and
a circuit to prevent a well of the pass device from being forward biased, wherein the circuit to prevent the well of the pass device from being forward biased includes a transistor connected to the well of the pass device and a capacitor connected to the transistor, the capacitor being adapted to control the transistor and to turn the transistor on before the pass device electrically connects the charge storage device to the output.

37. A computer system, comprising:
a processor;
a memory system coupled to the processor; and
a charge pump coupled to at least one of the processor and the memory system, wherein the charge pump includes:
a first main pump;
a second main pump;
a pre-charge circuit coupled to each of the first and second main pumps to pre-charge each of the first and second main pumps to a predetermined charge level;
a first pass device coupled between the first main pump and an output of the charge pump;
a second pass device coupled between the second main pump and an output of the charge pump; and
a circuit to clamp a well of each of the first and second pass devices to a voltage to prevent a latch-up condition in the first and second pass devices, wherein the circuit to clamp the well of each of the first and second pass devices includes a first clamp transistor coupled between a well of the first pass device and the first main pump capacitor;
a first clamp gate capacitor to control operation of the first clamp transistor;
a second clamp transistor coupled between a well of the second pass device and the second main pump capacitor; and
a second clamp gate capacitor to control operation of the second clamp transistor.

38. A computer system, comprising:
a processor;
a memory system coupled to the processor; and
a charge pump coupled to at least one of the processor and the memory system, wherein the charge pump includes:
a first main pump capacitor;
a second main pump capacitor;
a first pass transistor coupled between the first main pump capacitor and an output of the charge pump;
a second pass transistor coupled between the second main pump capacitor and the output of the charge pump; and
a circuit to clamp a well of the first pass transistor and a well the second pass transistor respectively to the first main pump capacitor and the second main pump capacitor before each of the first and second main pump capacitors are connected to the output of the charge pump and to release the well of the first pass transistor and the well of the second pass transistor respectively from the first main pump capacitor and the second main pump capacitor before each of the first and second main pump capacitors are charged.

39. A computer system, comprising:
a processor;
a memory system coupled to the processor; and
a charge pump coupled to at least one of the processor and the memory system, wherein the charge pump includes:
at least one main pump capacitor;
a pass device coupled to the at least one main pump capacitor; and
a circuit to prevent a latch-up condition in the pass device, wherein the circuit to prevent the latch-up condition includes:
a first clamp transistor coupled between a well of the pass device and the at least one main pump capacitor, wherein the first clamp gate transistor includes a first state that electrically releases the well of the pass device from the at least one first main pump capacitor and a second state that electrically connects the well of the pass device to the at least one main pump capacitor; and
a first clamp gate capacitor connected to a gate of the first clamp transistor to control operation of the first clamp transistor.

40. A computer system, comprising:
a processor;
a memory system coupled to the processor; and
a charge pump coupled to at least one of the processor and the memory system, wherein the charge pump includes:
a charge storage device;
a pre-charge circuit to charge the charge storage device to a charge level to provide a predetermined output voltage from the charge pump;
a pass device coupled between the charge storage device and an output of the charge pump; and
a circuit to clamp a well of the pass device to a node of the charge pump having a voltage to prevent forward biasing of the well, wherein the circuit to clamp the well of the pass device includes a clamp transistor having a source/drain connected to the node and a gate connected to a clamp device control signal from a capacitor and a plurality of phase generators.

41. A semiconductor die, comprising:

a substrate; and an integrated circuit supported by the substrate, wherein the integrated circuit includes at least one charge pump including:
- a charge storage device;
- a pre-charge circuit to pre-charge the charge storage device to provide a predetermined voltage;
- a pass device coupled between the charge storage device and an output of the charge pump; and
- a circuit to prevent a well of the pass device from being forward biased, wherein the circuit to prevent the well of the pass device from being forward biased includes a transistor connected to the well of the pass device and a capacitor connected to the transistor, the capacitor being adapted to control the transistor and to turn the transistor on before the pass device electrically connects the charge storage device to the output.

42. A semiconductor die, comprising:

a substrate; and an integrated circuit supported by the substrate, wherein the integrated circuit includes at least one charge pump including:
- a first main pump;
- a second main pump;
- a pre-charge circuit coupled to each of the first and second main pumps to pre-charge each of the first and second main pumps to a predetermined charge level;
- a first pass device coupled between the first main pump and an output of the charge pump;
- a second pass device coupled between the second main pump and an output of the charge pump; and
- a circuit to clamp a well of each of the first and second pass devices to a voltage to prevent a latch-up condition in the first and second pass devices, wherein the circuit to prevent the latch-up condition includes:
  - a first clamp transistor coupled between a well of the first pass device and the first main pump capacitor;
  - a first clamp gate capacitor to control operation of the first clamp transistor;
  - a second clamp transistor coupled between a well of the second pass device and the second main pump capacitor; and
  - a second clamp gate capacitor to control operation of the second clamp transistor.

43. A semiconductor die, comprising:

a substrate; and an integrated circuit supported by the substrate, wherein the integrated circuit includes at least one charge pump including:
- a first main pump capacitor;
- a second main pump capacitor;
- a first pass transistor coupled between the first main pump capacitor and an output of the charge pump;
- a second pass transistor coupled between the second main pump capacitor and the output of the charge pump; and
- a circuit to clamp a well of the first pass transistor and a well the second pass transistor respectively to the first main pump capacitor and the second main pump capacitor before each of the first and second main pump capacitors are connected to the output of the charge pump and to release the well of the first pass transistor and the well of the second pass transistor respectively from the first main pump capacitor and the second main pump capacitor before each of the first and second main pump capacitors are charged.

44. A semiconductor die, comprising:

a substrate; and an integrated circuit supported by the substrate, wherein the integrated circuit includes at least one charge pump including:
- at least one main pump capacitor;
- a pass device coupled to the at least one main pump capacitor; and
- a circuit to prevent a latch-up condition in the pass device, wherein the circuit to prevent the latch-up condition includes:
  - a first clamp transistor coupled between a well of the pass device and the at least one main pump capacitor, wherein the first clamp gate transistor includes a first state that electrically releases the well of the pass device from the at least one first main pump capacitor and a second state that electrically connects the well of the pass device to the at least one main pump capacitor; and
  - a first clamp gate capacitor connected to a gate of the first clamp transistor to control operation of the first clamp transistor.

45. A semiconductor die, comprising:

a substrate; and an integrated circuit supported by the substrate, wherein the integrated circuit includes at least one charge pump including:
- a charge storage device;
- a pre-charge circuit to charge the charge storage device to a charge level to provide a predetermined output voltage from the charge pump;
- a pass device coupled between the charge storage device and an output of the charge pump; and
- a circuit to clamp a well of the pass device to the charge storage device before the charge storage device is connected to the output of the charge pump and to release the well of the pass device from the charge storage device before the charge storage device is charged.

46. A method for generating a predetermined voltage higher or more negative than a supply voltage, comprising:

generating a plurality of signals;

boosting a charge level of a charge storage device in response to the plurality of signals;

outputting the predetermined voltage when the charge level of the charge storage device reaches a predetermined level;

repeating a cycle of boosting the charge level of the storage device; and preventing a latch-up condition by electrically connecting a well of a pass device to the charge storage device before connecting the charge storage device to an output.

47. The method of claim 46, wherein boosting the charge level of the charge storage device comprises pre-charging at least one pre-charge circuit.

48. The method of claim 46, wherein preventing a latch-up condition comprises preventing a well of a pass device coupled between the charge storage device and an output of a charge pump from being forward biased.

49. The method of claim 46, wherein boosting the level of a charge storage device comprises:
pre-charging a first main pump capacitor to a first predetermined charge level responsive to a first pre-boot capacitor receiving a second and a third driver signal;
pre-charging a second main pump capacitor to the first predetermined charge level responsive to a second pre-boot capacitor receiving a first and a fourth driver signal;
pre-charging the first main pump capacitor to a second predetermined charge level responsive to a first pre-charge capacitor receiving a seventh driver signal;
pre-charging the second main pump capacitor to the second predetermined charge level responsive to a second pre-charge capacitor receiving an eighth driver signal;
pre-charging the first main pump capacitor to a third predetermined charge level responsive to the first main pump capacitor receiving a fifth driver signal; and
pre-charging the second main pump capacitor to the third predetermined charge level responsive to the second main pump capacitor receiving a sixth driver signal.

50. A method for generating a predetermined voltage higher or more negative than a supply voltage, comprising:
generating a plurality of signals;
boosting a charge level of a charge storage device in response to the plurality of signals;
outputting the predetermined voltage through a pass device when the charge level of the charge storage device reaches a predetermined level;
repeating a cycle of boosting the charge level of the storage device; and
preventing a well of the pass device from becoming forward biased by selectively connecting the charge storage device to the pass device through a clamp transistor.

51. The method of claim 50, wherein preventing the well of the pass device from becoming forward biased includes controlling a gate of the clamp transistor with a signal from a capacitor.

52. A method for generating a predetermined voltage higher or more negative than a supply voltage, comprising:
generating a plurality of signals;
boosting a charge level of a charge storage device in response to the plurality of signals;
outputting the predetermined voltage through a pass device when the charge level of the charge storage device reaches a predetermined level;
repeating a cycle of boosting the charge level of the storage device;
coupling a well of the pass device to the charge storage device before connecting the charge storage device to an output of a charge pump; and
releasing the well of the pass device before charging the charge storage device.

53. A method for generating a predetermined voltage higher or more negative than a supply voltage, comprising:
generating a plurality of signals;
boosting a charge level of a charge storage device in response to the plurality of signals;
outputting the predetermined voltage through a pass device when the charge level of the charge storage device reaches a predetermined level;
repeating a cycle of boosting the charge level of the storage device; and
preventing latch-up of the pass device by selectively connecting the charge storage device to the pass device through a clamp transistor and controlling a gate of the clamp transistor with a signal from a capacitor.

54. A method for generating a predetermined voltage higher or more negative than a supply voltage, comprising:
boosting a charge level of a first main pump capacitor;
boosting a charge level of a second main pump capacitor;
alternately outputting the predetermined voltage through a first pass device when the charge level of the first main pump capacitor reaches a level to provide the predetermined voltage and outputting the predetermined voltage through a second pass device to provide the predetermined voltage when the charge level of the second main pump capacitor reaches a level to provide the predetermined voltage;
clamping a well of the first pass device to a voltage to prevent the well from being forward biased, wherein clamping the well of the first pass device includes clamping the well to the first main pump capacitor before outputting the first main pump capacitor charge; and
clamping a well of the second pass device to a voltage to prevent the well from being forward biased, wherein clamping the well of the second pass device includes clamping the well to the second main pump capacitor before outputting the second main pump capacitor charge.

55. A method for making a charge pump, comprising:
forming a plurality of phase generators;
coupling first and second pre-boot capacitors to the plurality of phase generators;
coupling first and second main pump capacitors to the plurality of phase generators, and to the first and second pre-boot capacitors, respectively;
coupling first and second pass devices to the first and second main pump capacitors, respectively; and
forming a circuit to prevent a well the first and second pass devices from becoming forward biased, wherein forming the circuit includes connecting the gates of the first and second pass devices to the plurality of phase generators.

56. The method of claim 55, wherein connecting the gates of the first and second pass devices to the plurality of phase generators includes connecting the gates of the first and second pass devices to the plurality of phase generators through first and second clamp gate control capacitors.

57. A method for making a charge pump, comprising:
forming first and second pre-boot capacitors;
forming first and second main pump capacitors;
coupling the first and second main pump capacitors to the first and second pre-boot capacitors;
connecting the first and second main pump capacitors to an output through first and second pass devices, respectively; and
forming a circuit to prevent a latch-up condition in the charge pump, wherein forming the circuit includes providing first and second clamp control signals to first and second clamp control devices, the first and second clamp control devices respectively couple the first and second main pump capacitors to a well of the first and second pass devices, respectively.

58. A method for making a charge pump, comprising:

forming a charge storage device;

forming a pre-charge circuit for charging the charge storage device to a charge level to provide a predetermined output voltage from the charge pump;

forming a pass device to connect the charge storage device to an output of the charge pump; and forming a circuit to clamp the pass device to a voltage to prevent a latch-up condition in the pass device, wherein forming the circuit to clamp includes forming a circuit that clamps a well of the pass device to the charge storage device before the charge storage device provides a voltage to the output.

59. A method for making a charge pump, comprising:

forming a first main pump;

forming a second main pump;

forming a plurality of pre-charge circuits coupled to the first and second main pumps;

forming a first pass transistor to couple the first main pump to an output of the charge pump;

forming a second pass transistor to couple the second main pump to the output of the charge pump;

forming a first clamp transistor coupled to a well of the first pass transistor;

forming a second clamp transistor coupled to a well of the second pass transistor;

forming a first clamp control capacitor connected to a gate of the first clamp transistor; and forming a second clamp control capacitor connected to a gate of the second clamp transistor.

60. A method for making a charge pump, comprising:

forming a first main pump;

forming a second main pump;

forming a plurality of pre-charge circuits coupled to the first and second main pumps;

forming a first pass transistor to couple the first main pump to an output of the charge pump;

forming a second pass transistor to couple the second main pump to the output of the charge pump;

forming a first clamp transistor to clamp a well of the first pass transistor to the first main pump before the first main pump is connected to the output of the charge pump and to release the well of the first pass transistor before the first main pump is pre-charged;

forming a second clamp transistor to clamp a well of the second pass transistor to the second main pump before the second main pump is connected to the output of the charge pump and to release the well of the second pass transistor before the second main pump is pre-charged;

forming a first clamp control capacitor connected to a gate of the first clamp transistor; and forming a second clamp control capacitor connected to a gate of the second clamp transistor.

61. A method of making an electronic system, comprising:

forming a processor; and forming at least one charge pump, wherein forming the at least one charge pump includes:

forming a plurality of phase generators;

coupling first and second pre-boot capacitors to the plurality of phase generators;

coupling first and second main pump capacitors to the plurality of phase generators, and to the first and second pre-boot capacitors, respectively;

coupling first and second pass devices to the first and second main pump capacitors, respectively; and coupling a circuit to the first and second pass devices to prevent a well of each pass device from becoming forward biased, wherein coupling the circuit includes connecting a gate of each of the first and second pass devices to the plurality of phase generators.

62. The method of claim 61, wherein connecting the gate of each of the first and second pass devices to the plurality of phase generators includes connecting the gates of the first and second pass devices to the plurality of phase generators through first and second clamp gate control capacitors.

63. A method of making an electronic system, comprising:

forming a processor; and forming at least one charge pump, wherein forming the at least one charge pump includes:

forming a first main pump;

forming a second main pump;

forming a plurality of pre-charge circuits coupled to the first and second main pumps;

forming a first pass transistor;

forming a second pass transistor; and forming a circuit to prevent a latch-up condition in the charge pump, wherein forming the circuit includes:

forming a first clamp transistor coupled between a well of the first pass device and the first main pump;

forming a first clamp gate capacitor to control operation of the first clamp transistor;

forming a second clamp transistor coupled between a well of the second pass device and the second main pump; and forming a second clamp gate capacitor to control operation of the second clamp transistor.

64. A method of making an electronic system, comprising:

forming a processor; and forming at least one charge pump, wherein forming the at least one charge pump includes:

forming a charge storage device;

forming a pre-charge circuit for charging the charge storage device to a charge level to provide a predetermined output voltage from the charge pump;

forming a pass device to connect the charge storage device to an output of the charge pump; and forming a circuit to clamp the pass device to a voltage to prevent a latch-up condition in the pass device, wherein forming the circuit to clamp the pass device includes forming a clamp transistor that connects the charge storage device to a well of the pass device before the pass device connects the charge storage device to the output.

65. A method of making an integrated circuit, comprising:

providing a substrate; and forming at least one charge pump supported by the substrate, wherein forming the at least one charge pump includes:

forming a first main pump;

forming a second main pump;

forming a plurality of pre-charge circuits coupled to the first and second main pumps;

forming a first pass transistor to couple the first main pump to an output of the charge pump;

forming a second pass transistor to couple the second main pump to the output of the charge pump;

forming a first clamp transistor coupled to a well of the first pass transistor;

forming a second clamp transistor coupled to a well of the second pass transistor;

forming a first clamp capacitor connected to a gate of the first clamp transistor; and forming a second clamp capacitor connected to a gate of the second clamp transistor.

66. A method of making an integrated circuit, comprising:

providing a substrate; and forming at least one charge pump supported by the substrate, wherein forming the at least one charge pump includes:

forming a charge storage device;

forming a pre-charge circuit for charging the charge storage device to a charge level to provide a predetermined output voltage from the charge pump;

forming a pass device between the charge storage device and an output of the charge pump; and forming a clamp circuit to couple a well of the pass device to the charge storage device before the charge storage device is connected to the output of the charge storage device and to release the well of the pass device before the charge storage device is pre-charged.

67. A method of making an integrated circuit, comprising:

providing a substrate; and forming at least one charge pump supported by the substrate, wherein forming the at least one charge pump includes:

forming a first main pump;

forming a second main pump;

forming a plurality of pre-charge circuits coupled to the first and second main pumps;

forming a first pass transistor to couple the first main pump to an output of the charge pump;

forming a second pass transistor to couple the second main pump to the output of the charge pump;

forming a first clamp transistor to clamp a well of the first pass transistor to the first main pump before the first main pump is connected to the output of the charge pump and to release the well of the first pass transistor before the first main pump is pre-charged; and forming a second clamp transistor to clamp a well of the second pass transistor to the second main pump before the second main pump is connected to the output of the charge pump and to release the well of the second pass transistor before the second main pump is pre-charged.

68. The method of claim 67, wherein forming at least one charge pump further includes forming a first clamp control capacitor connected to a gate of the first clamp transistor.

69. The method of claim 68, wherein forming at least one charge pump further includes forming a second clamp control capacitor connected to a gate of the second clamp transistor.

* * * * *

UNITED STATES PATENT AND TRADEMARK OFFICE
CERTIFICATE OF CORRECTION

PATENT NO. : 6,646,493 B2
DATED : November 11, 2003
INVENTOR(S) : Butler

It is certified that error appears in the above-identified patent and that said Letters Patent is hereby corrected as shown below:

Column 2,
Line 50, after "accordance" insert -- with --.

Column 3,
Line 45, after "oxide" insert -- - --.

Column 10,
Line 29, delete "symnetrically" and insert -- symmetrically -- therefor.

Column 15,
Line 16, after "capacitors" insert -- , --.

Column 19,
Line 33, after "well" insert -- of --.

Column 24,
Line 24, after "well" insert -- of --.

Column 25,
Line 67, after "well" insert -- of --.

Column 28,
Line 42, after "well" insert -- of --.

Signed and Sealed this

Fifteenth Day of June, 2004

JON W. DUDAS
*Acting Director of the United States Patent and Trademark Office*